US012684559B2

(12) United States Patent
Bejjipuram et al.

(10) Patent No.: US 12,684,559 B2
(45) Date of Patent: Jul. 14, 2026

(54) POLICY BASED PERFORMANCE MANAGEMENT FOR HIGHLY SCALABLE O-RAN NETWORKS

(71) Applicant: Mavenir Systems, Inc., Richardson, TX (US)

(72) Inventors: Sombabu Bejjipuram, Andhra Pradesh (IN); Mukesh Taneja, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 346 days.

(21) Appl. No.: 18/438,597

(22) Filed: Feb. 12, 2024

(65) Prior Publication Data

US 2024/0284441 A1 Aug. 22, 2024

(30) Foreign Application Priority Data

Feb. 17, 2023 (IN) .............................. 202321011015
Mar. 22, 2023 (IN) .............................. 202321020065

(51) Int. Cl.
*H04W 4/00* (2018.01)
*H04W 24/02* (2009.01)
(Continued)

(52) U.S. Cl.
CPC ....... *H04W 72/1263* (2013.01); *H04W 24/02* (2013.01); *H04W 72/543* (2023.01); *H04W 72/566* (2023.01)

(58) Field of Classification Search
CPC ........... H04W 72/1263; H04W 72/543; H04W 72/566; H04W 24/02
(Continued)

(56) References Cited

U.S. PATENT DOCUMENTS

2020/0154287 A1* 5/2020 Novlan ............. H04W 36/0069
2022/0124543 A1* 4/2022 Orhan ................. H04W 28/021
(Continued)

FOREIGN PATENT DOCUMENTS

WO 2022187139 9/2022
WO 2022252162 12/2022

OTHER PUBLICATIONS

3rd Generation Partnership Project 3GPP TS38.300 V1XX.0 "3rd Generation Partnership Project; Technical Specification Group Radio Access Network; NR; NR and NNG-RAN Overall Description Stage 2 (Release 17)" 2022-12, 3GPP, Valbonne, France.
(Continued)

*Primary Examiner* — Temica M Beamer

(74) *Attorney, Agent, or Firm* — Ruggiero McAllister & McMahon LLC

(57) ABSTRACT

A method for enhanced radio resource management of radio access network (RAN) based on machine-learning-based technique includes: deploying a trained machine-learning-based model trained on a plurality of RAN-related parameters for a selected user equipment (UE) on the RAN, including i) plurality of trained weights for determining scheduling priority of the selected UE, ii) a network operator policy influencing scheduling priority of the selected UE, and iii) at least one of Packet Delay Budget (PDB), a target guaranteed bit rate (GBR), and proportional fair (PF) metric of the selected UE; computing, at the RIC, a difference between two consecutive overall error functions for PDB, GBR, and PF calculated based on corresponding observed values at two consecutive sampling time points; and updating, at the RIC, the plurality of weights based on the difference between the first and second overall error functions.

20 Claims, 14 Drawing Sheets

(51) Int. Cl.
　　*H04W 72/1263*　　　(2023.01)
　　*H04W 72/543*　　　(2023.01)
　　*H04W 72/566*　　　(2023.01)

(58) Field of Classification Search
　　USPC ........................................................ 370/329
　　See application file for complete search history.

(56)　　　　　　　　References Cited

U.S. PATENT DOCUMENTS

| | | |
|---|---|---|
| 2022/0272794 A1 | 8/2022 | Aftab et al. |
| 2024/0098575 A1* | 3/2024 | Singh .................... H04W 28/16 |

OTHER PUBLICATIONS

3rd Generation Partnership Project 3GPP TS23.501 V18.0.0 "3rd Generation Partnership Project; Technical Specification Group Services and System Aspects; System Architecture for the 5G System (5GS) Stage 2 (Release 18)" Dec. 2022, 3GPP, Valbonne, France.
Extended European Search Report for corresponding European application EP 24157602.4, 10 pages, dated Jul. 16, 2024.
Kumar et al: "MCORANFed:Communication Efficient Federated Learning in Open RAN", 2022 14th IFIP Wireless and Mobile Networking Conference (WMNC), IFIP, Oct. 17, 2022 (Oct. 17, 2022), pp. 15-22.
Balasubramanian et al: "RIC: A RAN Intelligent Controller Platform for AI-Enabled Cellular Networks", IEEE Internet Computing., vol. 25, No. 2, Mar. 1, 2021 (Mar. 1, 2021), pp. 7-17.
O-RAN Alliance "AI/ML workflow description and requirements",Technical Report, O-RAN.WG2.AIML-V01.03 Oct. 1, 2021 (Oct. 1, 2021), pp. 1-58, Alter, Germany.

* cited by examiner

1101 Initialize the weights

1102 Use the weights for $T_{fdbk}$ interval, for UE priority calculations in scheduling UEs 1103 Use parameters related to instances over $T_{fdbk}$ interval to compute least squared error 1104 Update new weights according to weight updating method to minimize error difference 1201 Compute the error functions $E_{PDB}$, $E_{GBR}$, $E_{PF}$ for two consecutive sampling instants.

1202 Find the difference in error (D) for each function.

1203 D>0 ?

Yes

1204 Weight adjusted and updated

No

1205 No change in Weight

POLICY BASED PERFORMANCE MANAGEMENT FOR HIGHLY SCALABLE O-RAN NETWORKS

CROSS-REFERENCE TO RELATED APPLICATIONS

The present application claims priority to Indian Provisional Patent Application No. 202321011015 filed on Feb. 17, 2023, and Indian Provisional Patent Application No. 202321020065 filed on Mar. 22, 2023, the entirety of which are incorporated by reference herein.

BACKGROUND OF THE DISCLOSURE

1. Field of the Invention

The present disclosure is related to Open Radio Access Network (O-RAN) wireless systems, and relates more particularly to policy-based network performance management in O-RAN systems.

2. Description of Related Art

In the following sections, overview of Next Generation Radio Access Network (NG-RAN) architecture and 5G New Radio (NR) stacks will be discussed. 5G NR (New Radio) user and control plane functions with monolithic gNB (gNodeB) are shown in FIGS. 1-2. For the user plane (shown in FIG. 1, which is in accordance with 3GPP TS 38.300), PHY (physical), MAC (Medium Access Control), RLC (Radio Link Control), PDCP (Packet Data Convergence Protocol) and SDAP (Service Data Adaptation Protocol) sublayers originate in the UE 101 and are terminated in the gNB 102 on the network side. For the control plane (shown in FIG. 2, which is in accordance with 3GPP TS 38.300), RRC (Radio Resource Control), PDCP, RLC, MAC and PHY sublayers originate in the UE 101 and are terminated in the gNB 102 on the network side, and NAS (Non-Access Stratum) originate in the UE 101 and is terminated in the AMF (Access Mobility Function) 103 on the network side.

NG-Radio Access Network (NG-RAN) architecture from 3GPP TS 38.401 is shown in FIGS. 3-4. As shown in FIG. 3, the NG-RAN 301 consists of a set of gNBs 302 connected to the 5GC 303 through the NG interface. Each gNB comprises gNB-CU 304 and one or more gNB-DU 305 (see FIG. 3). As shown in FIG. 4 (which illustrates separation of CU-CP (CU-Control Plane) and CU-UP (CU-User Plane)), E1 is the interface between gNB-CU-CP (CU-Control Plane) 304a and gNB-CU-UP (CU-User Plane) 304b, F1-C is the interface between gNB-CU-CP 304a and gNB-DU 305, and F1-U is the interface between gNB-CU-UP 304b and gNB-DU 305. As shown in FIG. 4, gNB 302 can consist of a gNB-CU-CP 304a, multiple gNB-CU-Ups 304b and multiple gNB-DUs 305. One gNB-DU 305 is connected to only one gNB-CU-CP 304a, and one gNB-CU-UP 304b is connected to only one gNB-CU-CP 304a.

In this section, an overview Layer 2 (L2) of 5G NR will be provided in connection with FIGS. 5-7. L2 of 5G NR is split into the following sublayers (in accordance with 3GPP TS 38.300):

1) Medium Access Control (MAC) 501 in FIGS. 5-7: The MAC sublayer offers Logical Channels (LCs) to the RLC sublayer. This layer runs a MAC scheduler to schedule radio resources across different LCs (and their associated radio bearers).

2) Radio Link Control (RLC) 502 in FIGS. 5-7: The RLC sublayer offers RLC channels to the Packet Data Convergence Protocol (PDCP) sublayer. The RLC sublayer supports three transmission modes: RLC-Transparent Mode (RLC-TM), RLC-Unacknowledged Mode (RLC-UM) and RLC-Acknowledgement Mode (RLC-AM). RLC configuration is per logical channel. It hosts ARQ (Automatic Repeat Request) protocol for RLC-AM mode.

3) Packet Data Convergence Protocol (PDCP) 503 in FIGS. 5-7: The PDCP sublayer offers Radio Bearers (RBs) to the SDAP sublayer. There are two types of Radio Bearers: Data Radio Bearers (DRBs) for data, and Signaling Radio Bearers (SRBs) for control plane.

4) Service Data Adaptation Protocol (SDAP) 504 in FIGS. 5-7: The SDAP offers QoS Flows to the 5GC (5G Core). This sublayer provides mapping between a QoS flow and a DRB. It marks QoS Flow Id in DL (downlink) as well as UL (uplink packets).

FIG. 5 is a block diagram illustrating DL L2 structure, in accordance with 3GPP TS 38.300. FIG. 6 is a block diagram illustrating UL L2 structure, in accordance with 3GPP TS 38.300. FIG. 7 is a block diagram illustrating L2 data flow example, in accordance with 3GPP TS 38.300 (in FIG. 7, H denotes headers or sub-headers).

Open Radio Access Network (O-RAN) is based on disaggregated components which are connected through open and standardized interfaces based on 3GPP NG-RAN. An overview of O-RAN with disaggregated RAN CU (Centralized Unit), DU (Distributed Unit), and RU (Radio Unit), near-real-time Radio Intelligent Controller (RIC) and non-real-time RIC is illustrated in FIG. 8.

As shown in FIG. 8, the CU (shown split as O-CU-CP 801a and O-CU-UP 801b) and the DU (shown as O-DU 802) are connected using the F1 interface (with F1-C for control plane and F1-U for user plane traffic) over a mid-haul (MH) path. One DU can host multiple cells (e.g., one DU could host 24 cells) and each cell may support many users. For example, one cell may support 600 Radio Resource Control (RRC)-connected users and out of these 600, there may be 200 Active users (i.e., users that have data to send at a given point of time).

A cell site can comprise multiple sectors, and each sector can support multiple cells. For example, one site could comprise three sectors and each sector could support eight cells (with eight cells in each sector on different frequency bands). One CU-CP (CU-Control Plane) could support multiple DUs and thus multiple cells. For example, a CU-CP could support 1,000 cells and around 100,000 User Equipments (UEs). Each UE could support multiple Data Radio Bearers (DRB) and there could be multiple instances of CU-UP (CU-User Plane) to serve these DRBs. For example, each UE could support 4 DRBs, and 400,000 DRBs (corresponding to 100,000 UEs) may be served by five CU-UP instances (and one CU-CP instance).

The DU could be located in a private data center, or it could be located at a cell-site. The CU could also be in a private data center or even hosted on a public cloud system. The DU and CU, which are typically located at different physical locations, could be tens of kilometers apart. The CU communicates with a 5G core system, which could also be hosted in the same public cloud system (or could be hosted by a different cloud provider). A RU (Radio Unit) (shown as O-RU 803 in FIG. 8) is located at a cell-site and communicates with the DU via a front-haul (FH) interface.

The E2 nodes (CU and DU) are connected to the near-real-time RIC 132 using the E2 interface. The E2 interface is used to send data (e.g., user, cell, slice KPMs) from the RAN, and deploy control actions and policies to the RAN at near-real-time RIC 132. The application or service at the near-real-time RIC 132 that deploys the control actions and policies to the RAN are called xApps. The near-real-time RIC 132 is connected to the non-real-time RIC 133 (which is shown as part of Service Management and Orchestration (SMO) Framework 805 in FIG. 8) using the A1 interface. Also shown in FIG. 8 are O-eNB 806 (which is shown as being connected to the near-real-time RIC 132 and the SMO Framework 805) and O-Cloud 804 (which is shown as being connected to the SMO Framework 805).

In this section, PDU sessions, DRBs, and quality of service (QOS) flows will be discussed. In 5G networks, PDU connectivity service is a service that provides exchange of PDUs between a UE and a data network identified by a Data Network Name (DNN). The PDU Connectivity service is supported via PDU sessions that are established upon request from the UE. The DNN defines the interface to a specific external data network. One or more QoS flows can be supported in a PDU session. All the packets belonging to a specific QoS flow have the same 5QI (5G QoS Identifier). A PDU session consists of the following: Data Radio Bearer which is between UE and CU in RAN; and an NG-U GTP tunnel which is between CU and UPF (User Plane Function) in the core network. FIG. 9 illustrates an example PDU session (in accordance with 3GPP TS 23.501) consisting of multiple DRBs, where each DRB can consist of multiple QoS flows. In FIG. 9, three components are shown for the PDU session 901: UE 101; access network (AN) 902; and UPF 903, which includes Packet Detection Rules (PDRs) 9031

The following should be noted for 3GPP 5G network architecture, which is illustrated in FIG. 10 in the context of Radio Resource Management (RRM) (for connecting UE 101 to the network via RU 306) with a MAC Scheduler 1001:

1) The transport connection between the base station (i.e., CU-UP 304b) and the UPF 903 uses a single GTP-U tunnel per PDU session. The PDU session is identified using GTP-U TEID (Tunnel Endpoint Identifier).

2) The transport connection between the DU 305 and the CU-UP 304b uses a single GTP-U tunnel per DRB.
3) SDAP:
    a) The SDAP (Service Adaptation Protocol) 504 Layer receives downlink data from the UPF 903 across the NG-U interface.
    b) The SDAP 504 maps one or more QoS Flow(s) onto a specific DRB.
    c) The SDAP header is present between the UE 101 and the CU (when reflective QoS is enabled), and includes a field to identify the QoS flow within a specific PDU session.
4) User plane (UP) protocol includes a field to identify the QoS flow and is present between CU and UPF 903 (in the core network).
5) One (logical) RLC queue is implemented per DRB (or per logical channel), as shown in FIG. 10.

In this section, standardized 5QI to QoS characteristics mapping will be discussed. As per 3GPP TS 23.501, the one-to-one mapping of standardized 5QI values to 5G QoS characteristics is specified in Table 1 shown below. The first column represents the 5QI value. The second column lists the different resource types, i.e., as one of Non-GBR, GBR, Delay-critical GBR. The third column ("Default Priority Level") represents the priority level Priority5QI, for which lower the value the higher the priority of the corresponding QoS flow. The fourth column represents the Packet Delay Budget (PDB), which defines an upper bound for the time that a packet may be delayed between the UE and the N6 termination point at the UPF. The fifth column represents the Packet Error Rate (PER). The sixth column represents the maximum data burst volume for delay-critical GBR types. The seventh column represents averaging window for GBR, delay critical GBR types.

For example, as shown in Table 1, 5QI value 1 is of resource type GBR with the default priority value of 20, PDB of 100 ms, PER of 0.01, and averaging window of 2000 ms. Conversational voice falls under this category. Similarly, as shown in Table 1, 5QI value 7 is of resource type Non-GBR with the default priority value of 70, PDB of 100 ms and PER of 0.001. Voice, video (live streaming), and interactive gaming fall under this category.

TABLE 1

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 | | 30 | 50 ms (NOTE 11, NOTE 13) | $10^{-3}$ | N/A | 2000 ms | Real Time Gaming, V2X messages (see TS 23.287 [121]). Electricity distribution - medium voltage, Process automation monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g., MCPTT) |

TABLE 1-continued

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 66 (NOTE 12) | | 20 | 100 ms (NOTE 10, NOTE 13) | $10^{-2}$ | N/A | 2000 ms | Non-Mission-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| 71 | | 56 | 150 ms (NOTE 11, NOTE 13, NOTE 15) | $10^{-6}$ | N/A | 2000 ms | "Live" Uplink Streaming (e.g. TS 26.238 [76]) |
| 72 | | 56 | 300 ms (NOTE 11, NOTE 13, NOTE 15) | $10^{-4}$ | N/A | 2000 ms | "Live" Uplink Streaming (e.g. TS 26.238 [76] |
| 73 | | 56 | 300 ms (NOTE 11, NOTE 13, NOTE 15) | $10^{-8}$ | N/A | 2000 ms | "Live" Uplink Streaming (e.g. TS 26.238 [76]) |
| 74 | | 56 | 500 ms (NOTE 11, NOTE 15) | $10^{-8}$ | N/A | 2000 ms | "Live" Uplink Streaming (e.g. TS 26.238 [76]) |
| 76 | | 56 | 500 ms (NOTE 11, NOTE 13, NOTE 15) | $10^{-4}$ | N/A | 2000 ms | "Live" Uplink Streaming (e.g. TS 26.238 [76]) |
| 5 | Non-GBR (NOTE 1) | 10 | 100 ms NOTE 10, NOTE 13) | $10^{-6}$ | N/A | N/A | IMS Signalling |
| 6 | | 60 | 300 ms (NOTE 10, NOTE 13) | $10^{-8}$ | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) interactive Gaming |

In this section, Radio Resource Management (RRM) will be discussed (a block diagram for an example RRM with a MAC Scheduler is shown in FIG. 10). L2 methods (such as MAC scheduler) play a critical role in allocating radio resources to different UEs in a cellular network. The scheduling priority of a UE, i.e., $P_{UE}$, is determined as part of MAC scheduler as follows:

$$P_{UE} = W_{5QI} * P_{5QI} + W_{GBR} * P_{GBR} + W_{PDB} * P_{PDB}^{DU} + W_{PF} * P_{PF}$$

In the above expression, the parameters are defined as follows:

a) $P_{5QI}$ is the priority metric corresponding to the QoS class (5QI) of the logical channel. Incoming traffic from a DRB is mapped to Logical Channel (LC) at RLC level. $P_{5QI}$ is the default 5QI priority value, Priority$_{5QI}$, of a QoS flow that is mapped to the current LC. The lower the value of Priority$_{5QI}$ the higher the priority of the corresponding QoS flow. For example, Voice over New Radio (VoNR) (with 5QI of 1) will have a much higher $P_{5QI}$ compared to web browsing (with 5QI of 9).

b) $P_{GBR}$ is the priority metric corresponding to the target bit rate of the corresponding logical channel. The GBR metric $P_{GBR}$ represents the fraction of data that must be delivered to the UE within the time left in the current averaging window $T_{avg\_win}$ (as per 5QI table, default is 2000 msec.) to meet the UE's GBR requirement. $P_{GBR}$ is calculated as follows:

$$P_{GBR} = remData/targetData$$

where targetData is the total data bits to be served in each averaging window $T_{avg\_win}$ in order to meet the GFBR of the given QoS flow;

remData is the amount of data bits remaining to be served within the time left in the current averaging window;

Priority$_{GBR}$ is reset to 1 at the start of each averaging window $T_{avg\_win}$, and should go down to 0 towards the end of this window if the GBR criterion is met; and Priority$_{GBR}$=0 for non-GBR flows.

c)

$$P_{PDB}^{DU}$$

is the priority metric corresponding to the packet delay budget at DU (i.e., $PDB^{DU}$).

$$P_{PDB}^{DU} = 1 \text{ if } PDB^{DU} <=$$

$$QDelay_{RLC} \text{ and } P_{PDB}^{DU} = 1/\left(P_{PDB}^{DU} - QDelay_{RLC}\right) \text{ if } PDB^{DU} >$$

$QDelay_{RLC}$ where both $PDB^{DU}$ (Packet Delay Budget at DU) and RLC Queuing delay, $QDelay_{RLC}$, are measured in terms of slots. $QDelay_{RLC} = (t - T_{RLC})$ is the delay of the oldest RLC packet in the QoS flow that has not been scheduled yet, and it is calculated as the difference in time between the service data unit (SDU) insertion in RLC queue to current time where t:=current time instant, $T_{RLC}$:=time instant when oldest SDU was inserted in RLC.

d) $P_{PF}$ is the priority metric corresponding to proportional fair (PF) metric of the UE. $P_{PF}$ is the classical PF Metric, calculated on a per UE basis as $P_{PF} = r/R_{avg}$, where r: UE spectral efficiency calculated based on one RB & it's last reported CQI; and $R_{avg} = a \cdot R_{avg} + (1-a) \cdot b$, UE's average throughput, where b>=0 is #bits scheduled in current transmission time interval (TTI) and $0 < a <= 1$ is the infinite impulse response (IIR) filter coefficient.

e) In addition, the following weights are defined: 1) $W_{5QI}$ is the weight of $P_{5QI}$; 2) $W_{GBR}$ is the weight of $P_{GBR}$; 3) $W_{PDB}$ is the weight of $P_{PDB}$; and 4) $W_{PF}$ is the weight of $P_{PF}$. Each of the above weights is set to a value between 0 and 1.

In another example variant, the scheduling priority of a UE is determined as follows:

$$P_{UE} = W_{5QI} * P_{5QI} + \text{maximum}\left(W_{GBR} * P_{GBR} + W_{PDB} * P_{PDB}^{DU}\right) + W_{PF} * P_{PF},$$

or as $P_{UE} =$ $$W_{5QI} * P_{5QI} + \text{maximum}\left(W_{GBR} * P_{GBR}, W_{PDB} * P_{PDB}^{DU}\right) + W_{PF} * P_{PF}$$

In yet another example variant, the scheduling priority of a UE is determined as follows:

$$P_{UE} = (W_{5QI} * P_{5QI} + W_{PF} * P_{PF}) * \text{maximum}\left(W_{GBR} * P_{GBR} + W_{PDB} * P_{PDB}^{DU}\right),$$

or as $P_{UE} =$ $$(W_{5QI} * P_{5QI} + W_{PF} * P_{PF}) * \text{maximum}\left(W_{GBR} * P_{GBR}, W_{PDB} * P_{PDB}^{DU}\right)$$

The scheduling priority of a UE is based on the maximum logical channel priority value across the logical channels (LCs) of the UE, and the resources allocated to a UE are based on this maximum logical channel priority.

The above-described weights (e.g., $W_{5QI}$, $W_{GBR}$, $W_{PDB}$, $W_{PF}$) determine the importance of the priority values ($P_{5QI}$, $P_{GBR}$, $P_{PDB}$, $P_{PF}$). Determining the optimal weights (or substantially optimal weights) that balance the different target parameters (e.g., 5QI priority, target bit rate, packet delay budget, proportional fairness) is difficult, especially in the presence of different traffic types, varying channel conditions, high cell load, etc. The traffic could be different at different times in the day and night, and the traffic density varies with the region and/or location (rural, urban), e.g., there will be heavy traffic in crowded stadiums or malls. Static weights may not consider these variations for UE priority calculation in an optimal manner.

There is also a trade-off between maximizing cell throughput and providing performance guarantees for applications with diverse QoS requirements. An operator with a greater focus on increasing cell throughput may want to choose higher weights for the proportional fairness (i.e., $P_{PF}$) part in the scheduler metric described above. On the other end, an operator with main focus on providing performance guarantees may want to choose weights that help optimize application performance. Still yet, other operators may want to choose weights to support a good balance between cell throughput and meeting QoS requirements for good number of applications with diverse QoS requirements. These competing considerations make it challenging to select a suitable set of values for these weights.

Accordingly, there is a need for an enhanced system and method to determine suitable values of the weights used in determining scheduling priority of UEs for policy-based performance management in cellular networks.

SUMMARY

Accordingly, what is desired is a system and method to achieve enhanced radio resource management (RRM) by utilizing machine-learning-based methods.

According to an example embodiment, enhanced RRM utilizing machine-learning-based method is implemented, e.g., to determine suitable values of the weights for determining scheduling priority of UEs for policy-based performance management in cellular networks.

According to an example embodiment, enhanced RRM utilizing machine-learning-based method is implemented at distributed unit (DU)/Centralized unit (CU) or at a RAN Intelligent Controller (RIC) to determine suitable values of the weights for determining scheduling priority of UEs.

According to an example embodiment, enhanced RRM utilizing machine-learning-based method is implemented to determine, e.g., dynamically or in a semi-static manner, suitable values of the weights for determining scheduling priority of UEs.

According to an example embodiment, selection of suitable values of the weights for determining scheduling priority of UEs is linked with the flow-control procedure between Control Unit User Plane (CU-UP) and DU to help improve performance, e.g., for high-load networks).

According to an example method, machine learning techniques are incorporated to improve the determination of the priority of a UE at the Level 2 (L2) scheduler of the base station, e.g., by training, deploying, and updating the relevant parameters to provide policy-based determination of the priority of a UE.

According to an example method, machine-learning-assisted technique for determining suitable values of the weights for determining scheduling priority of UEs is implemented in conjunction with a near-real-time RIC (near-RT RIC).

According to an example method, machine-learning-assisted technique for determining suitable values of the weights for determining scheduling priority of UEs is implemented using DU and CU.

According to an example method, the least squares method is utilized to update the weights. The method of least squares is used in regression analysis, which minimizes the sum of the squared errors. As the objective function is a sum of squared errors, which is a convex function, so there exists a minimum, and the weight updating method moves in a direction to get to the error minimum. The weights are updated based on the difference in error between two consecutive samples, which is a tweaked version (or variant) of the gradient descent. The step size utilized in the weight updating determines how fast or slow the method converges to the minimum.

For this application the following terms and definitions shall apply:

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The above-described and other features and advantages of the present disclosure will be appreciated and understood by those skilled in the art from the following detailed description, drawings, and appended claims.

DETAILED DESCRIPTION

According to an example embodiment of the method according to the present disclosure, multiple parameters are utilized to train the machine-learning (ML) model which can be deployed i) at the DU and/or CU, or ii) at a near-RT RIC. The multiple parameters are computed (and/or acquired) every $T_{fdbk}$ interval, and the value of each parameter of a single UE calculated and/or acquired in a $T_{fdbk}$ interval define an "instance". $T_{fdbk}$ interval is measured in number of time slots. Every $T_{fdbk}$, multiple instances (of parameters) are used by the ML model. Although a static $T_{fdbk}$ is assumed in the present example embodiment, the example method is equally applicable in the case of dynamic intervals.

In the example embodiment, the following RAN-related parameters can be utilized to train the ML model:

1. $W_{GBR}$—this is the current weight of $P_{GBR}$ (which is the GBR priority value).
2. $W_{PDB}$—this is the current weight of $P_{PDB}$ (which is the PDB priority value).
3. $W_{PF}$—this is the current weight of $P_{PF}$ (which is the PF priority value).
4. $PDB_{UE}$—this is the packet delay budget corresponds to the particular UE's QoS flow.
5. $Delay_{UE}$—this is the sum of the midhaul, backhaul and $Age_{RLC}$ delays ($QDelay_{CU-UP}+QDealy_{RLC}$) of the UE.

$$Delay_{UE} = MidhaulDelay_{UE} + BackhaulDelay_{UE} + QDelay_{CU-UP} + QDealy_{RLC}.$$

Here, we can communicate $MidhaulDelay_{UE}$+$BackhaulDelay_{UE}$+$QDelay_{CU-CP}$ from CU-UP to DU by adding suitable objects in F1-C if the ML model is hosted at DU. In a later section, we describe the implementation for the case when the ML model is hosted at the RIC server.

6. $TarGbr_{UE}$—this is the target GBR of the UE.
7. $AchvGbr_{UE}$—this is the current achieved bit rate of the UE. If $AchvGbr_{UE}>TarGbr_{UE}$ we may optionally consider $AchvGbr_{UE}=TarGbr_{UE}$.
8. $Nprb_{UE}$—this is the number of PRBs allocated to each UE in the TTI.
9. $AvgPrb_{UE}$—The ratio of total Prbs to the number of active UEs in the system.
10. 1 or more operator policy to be applied.

Figure 1:
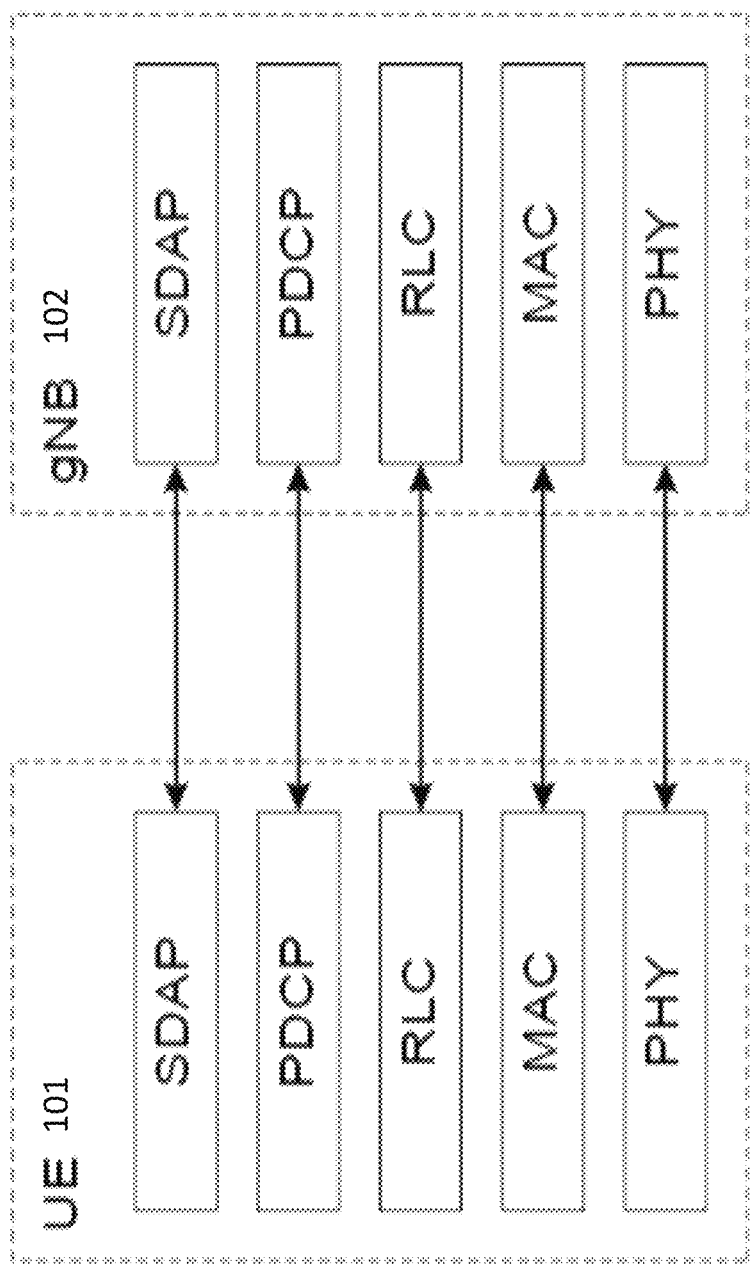
FIG. 1 is a block diagram illustrating the user plane stack of 5G NR.
Figure 2:
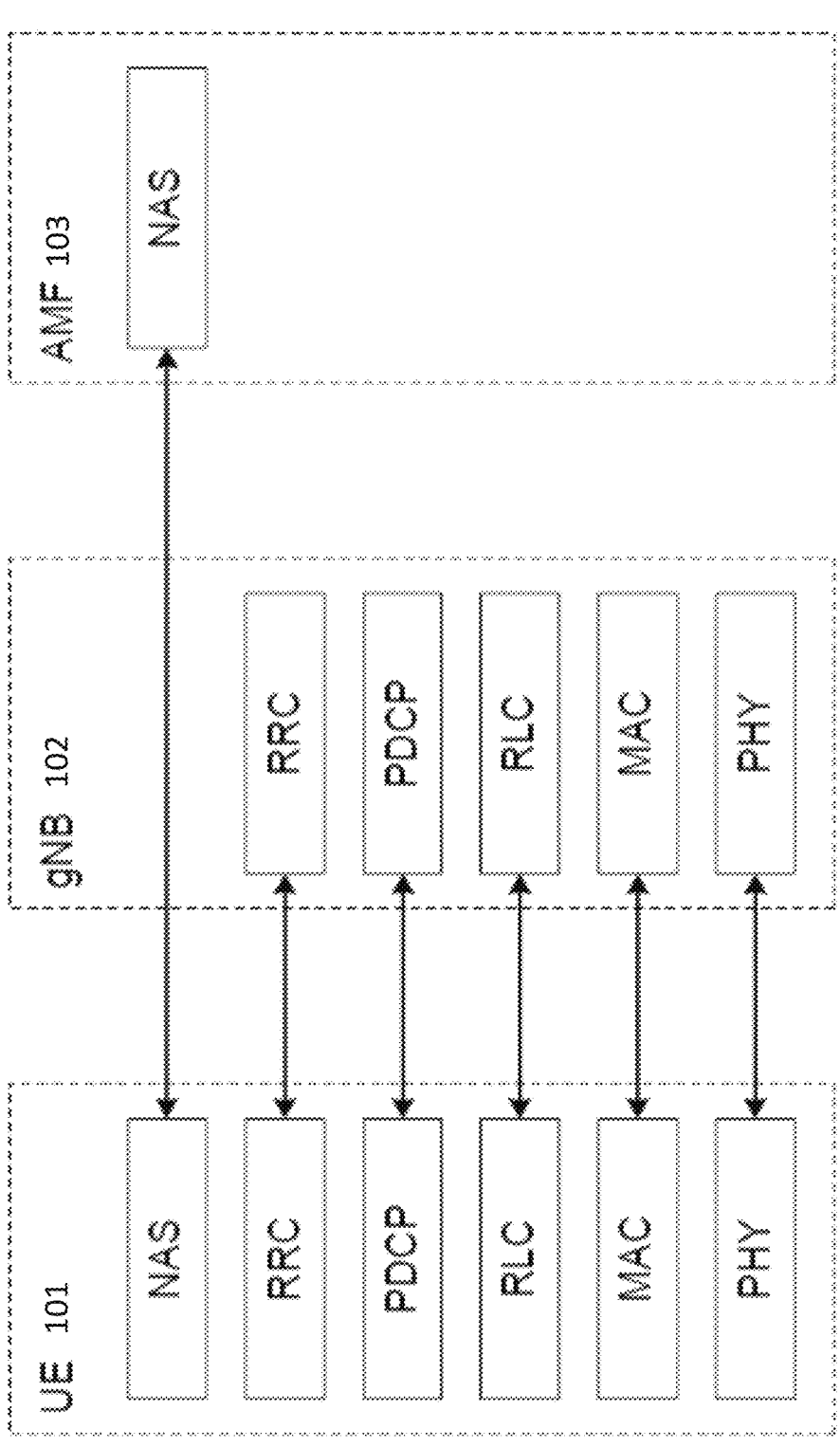
FIG. 2 is a block diagram illustrating the control plane stack of 5G NR.
Figure 3:
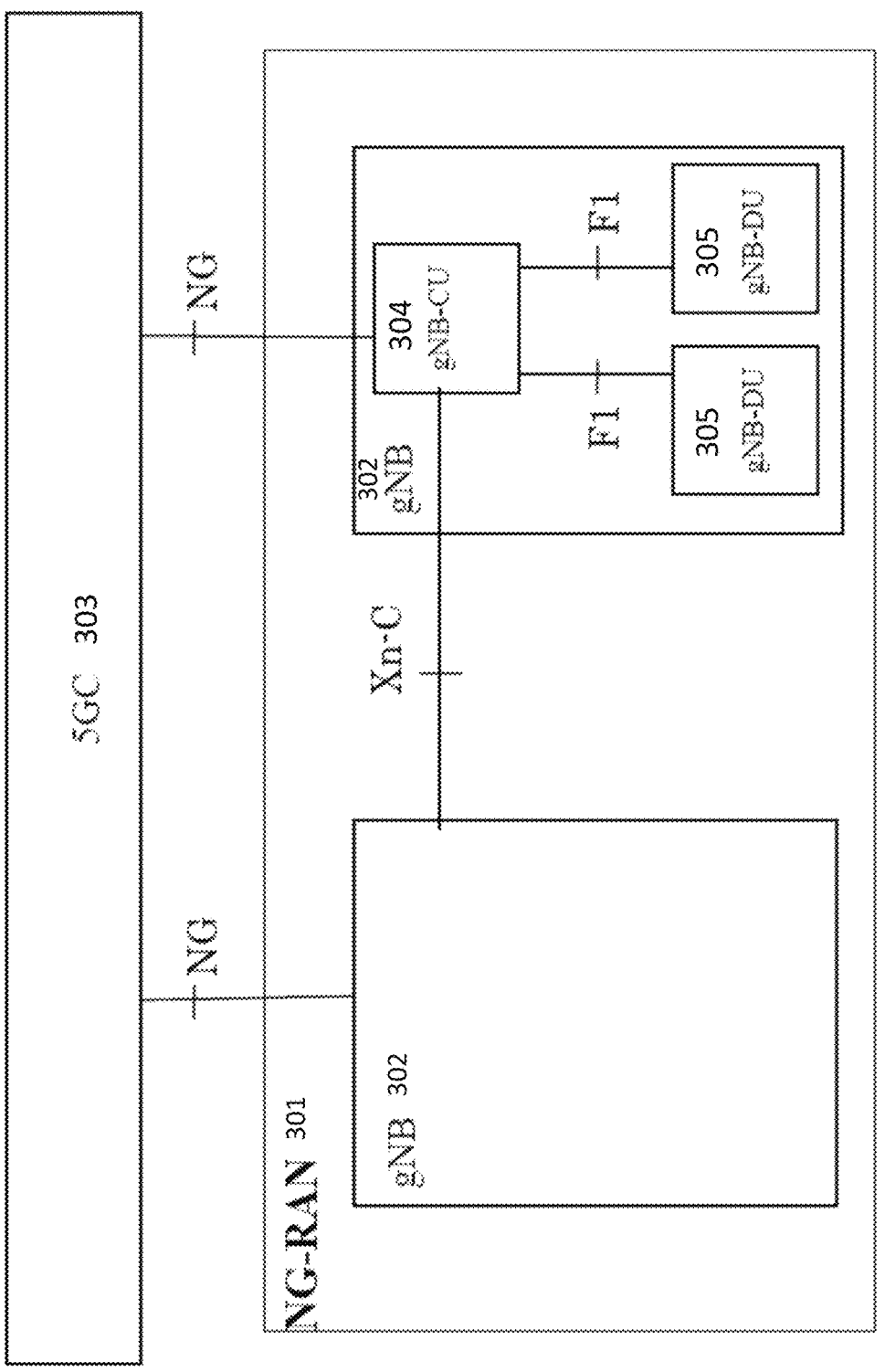
FIG. 3 is a block diagram illustrating NG-RAN architecture.
Figure 4:
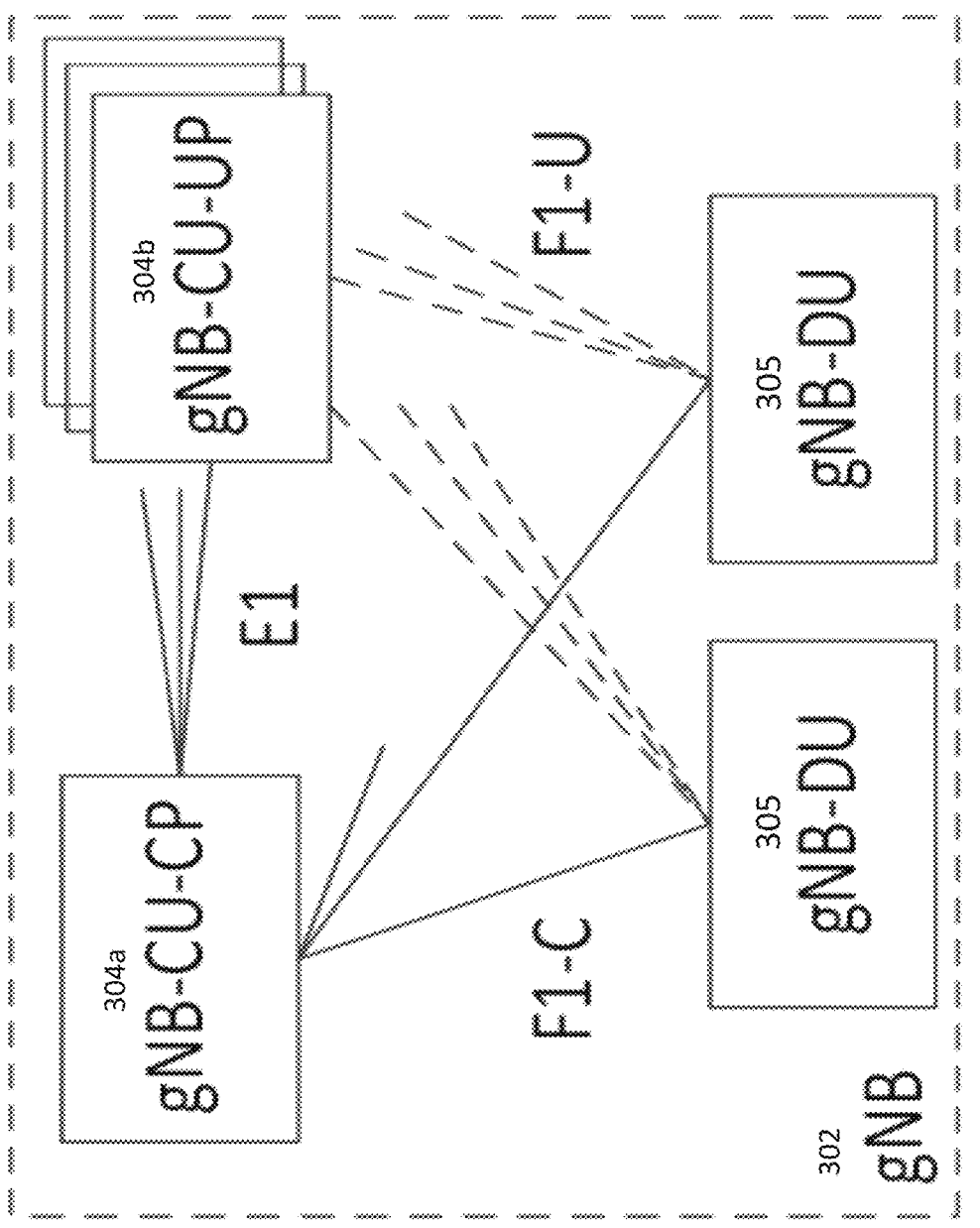
FIG. 4 is a block diagram illustrating separation of CU-CP and CU-UP in NG-RAN architecture.
Figure 5:
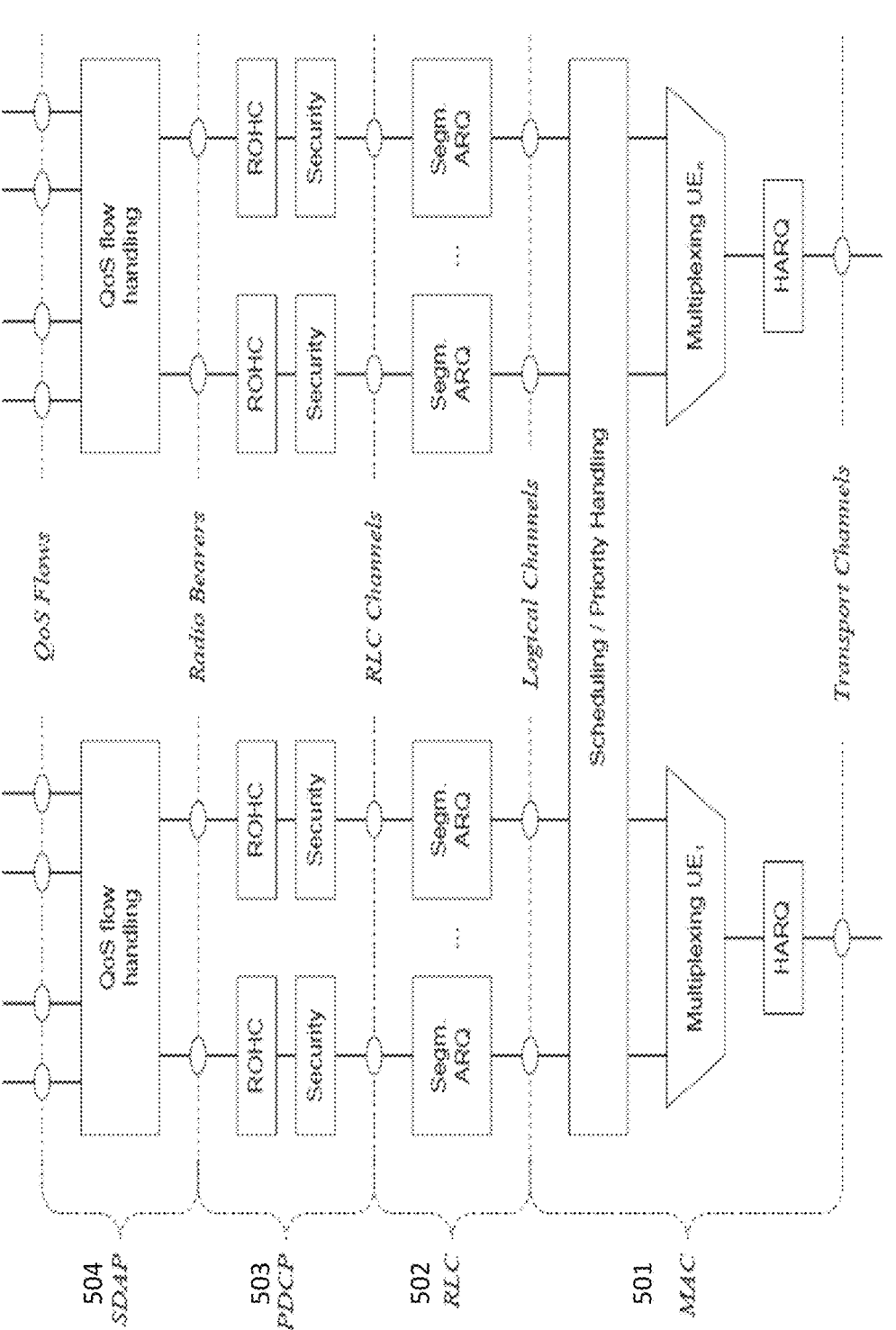
FIG. 5 is a block diagram illustrating DL L2 structure.
Figure 6:
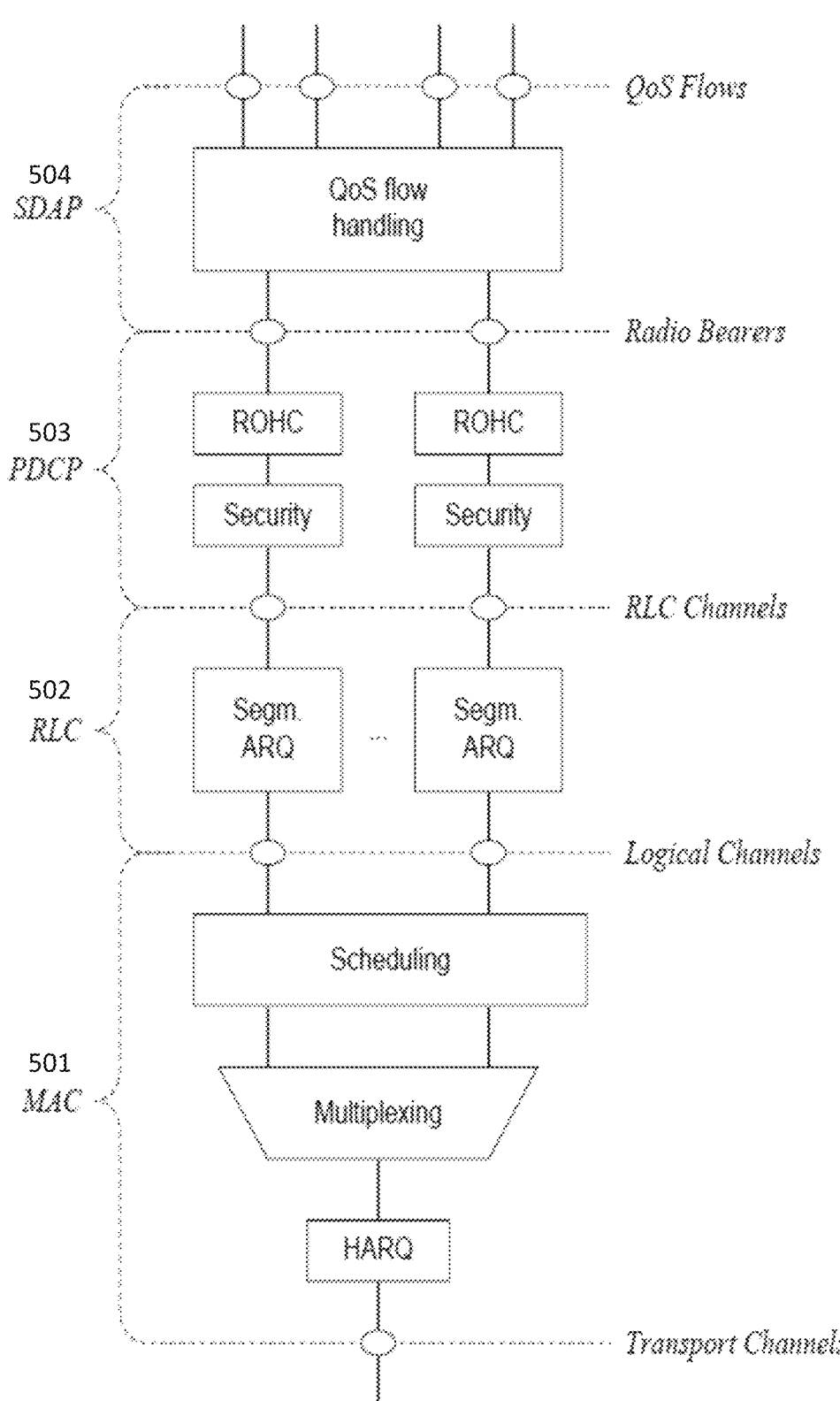
FIG. 6 is a block diagram illustrating UL L2 structure.
Figure 7:
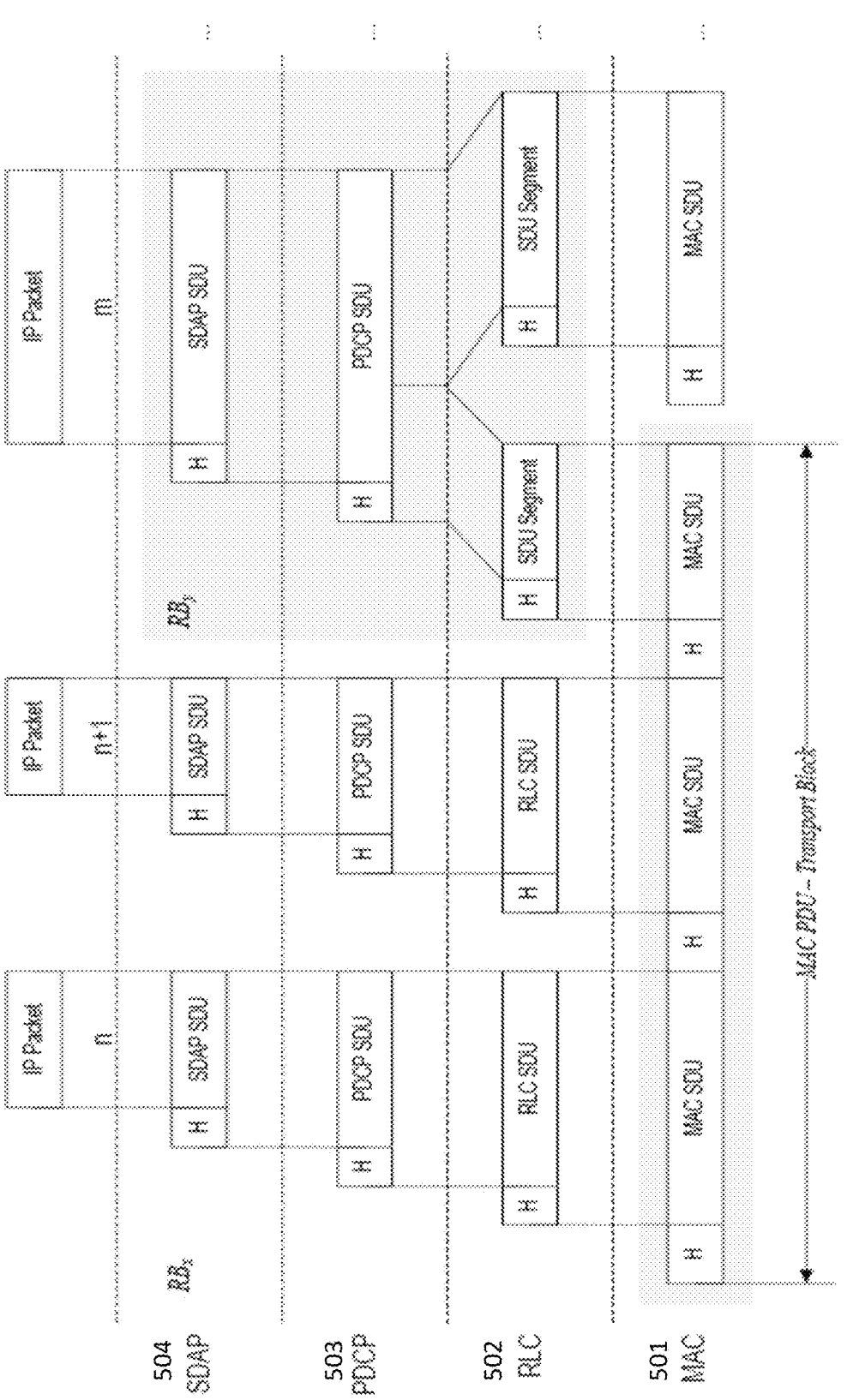
FIG. 7 is a block diagram illustrating L2 data flow example.
Figure 8:
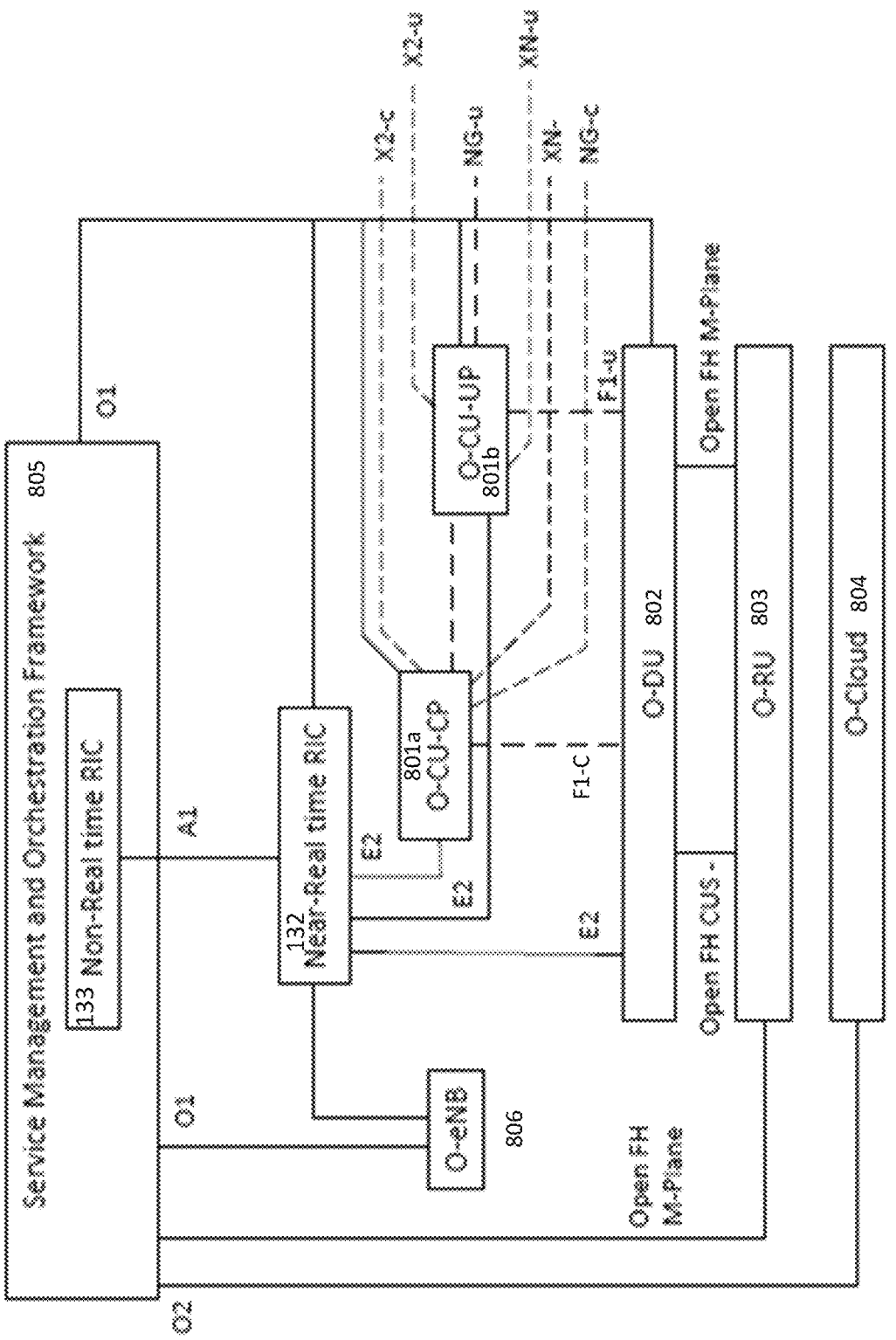
FIG. 8 illustrates an overview of O-RAN architecture.
Figure 9:
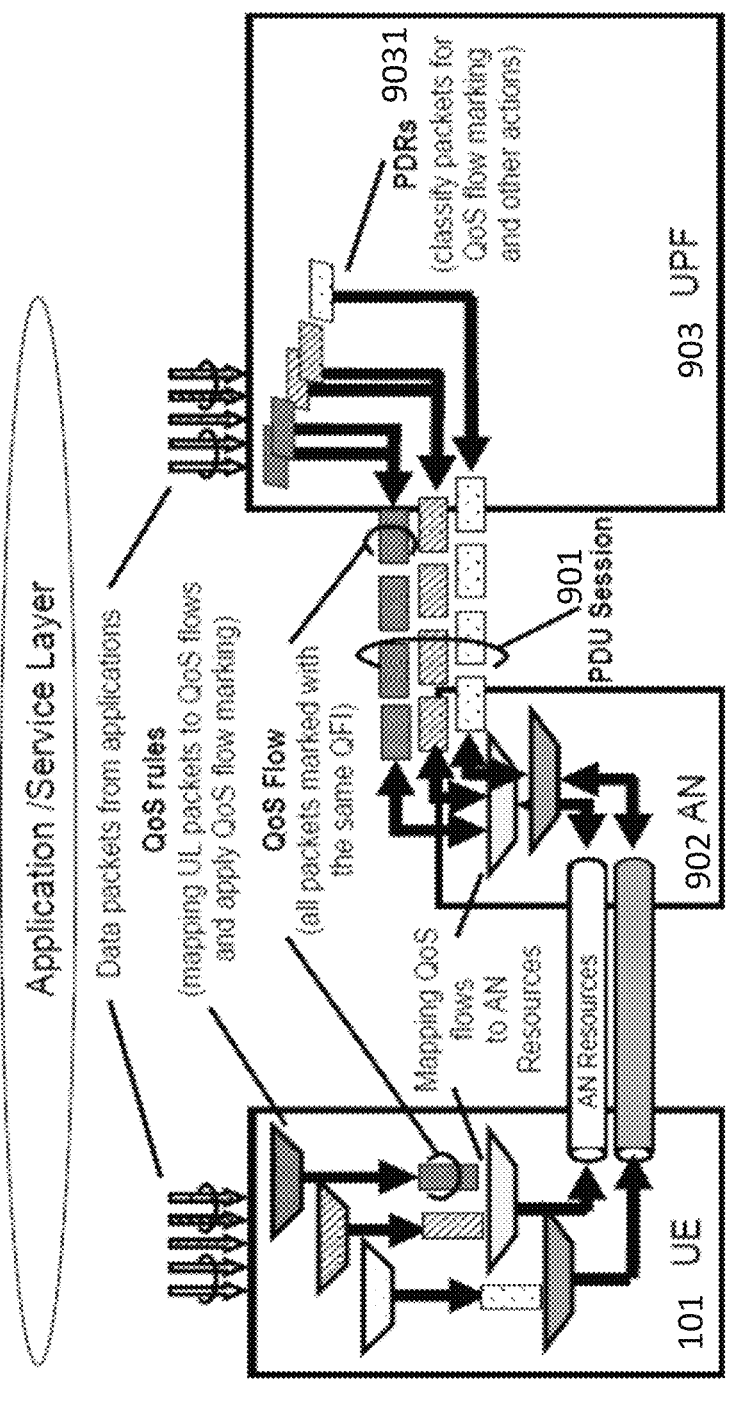
FIG. 9 is a block diagram illustrating an example PDU session consisting of multiple DRBs, each DRB consisting of one or more QoS flows.
Figure 10:
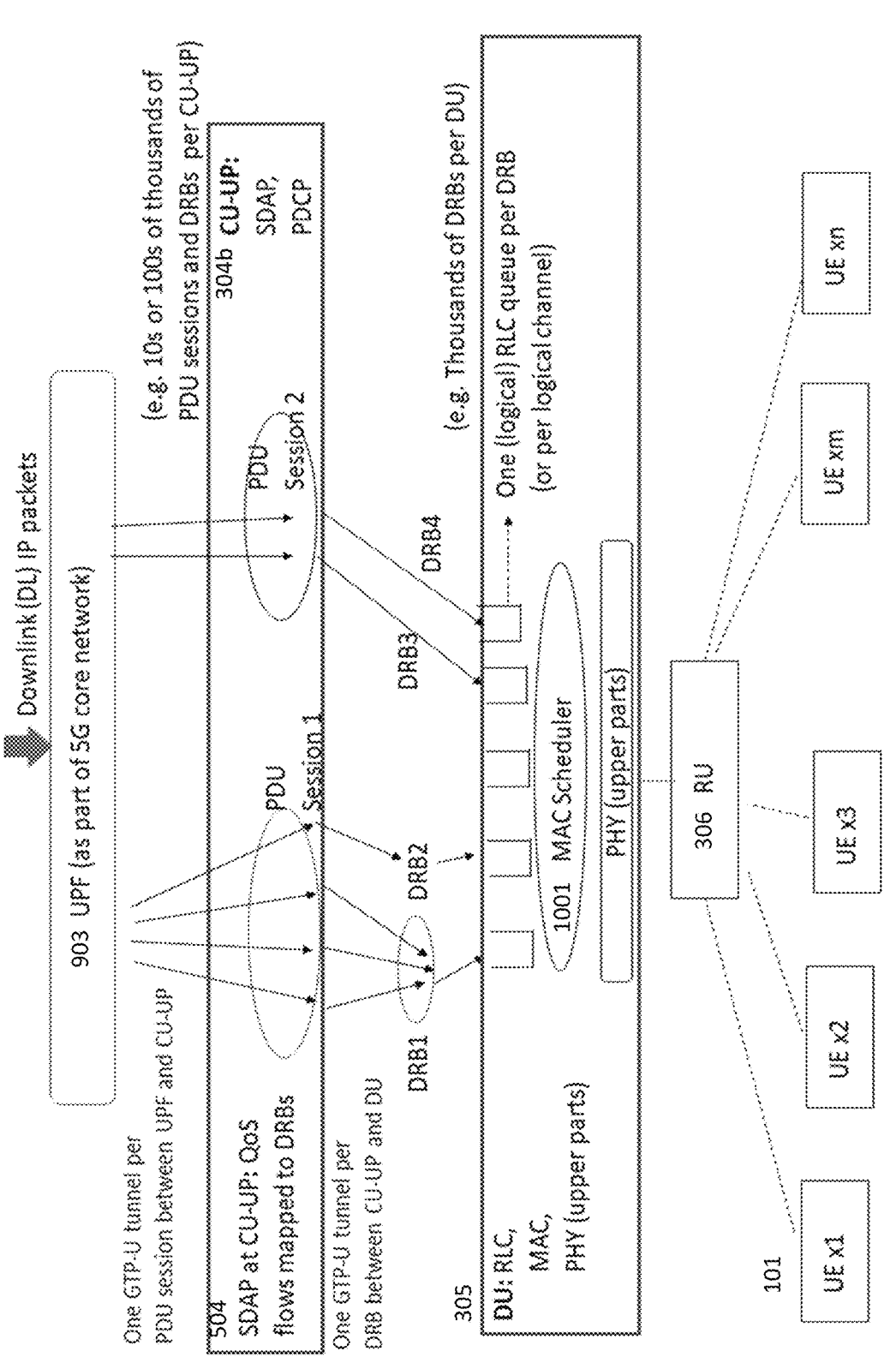
FIG. 10 illustrates 5G network architecture in the context of Radio Resource Management (RRM) with a MAC Scheduler.
Figure 11:
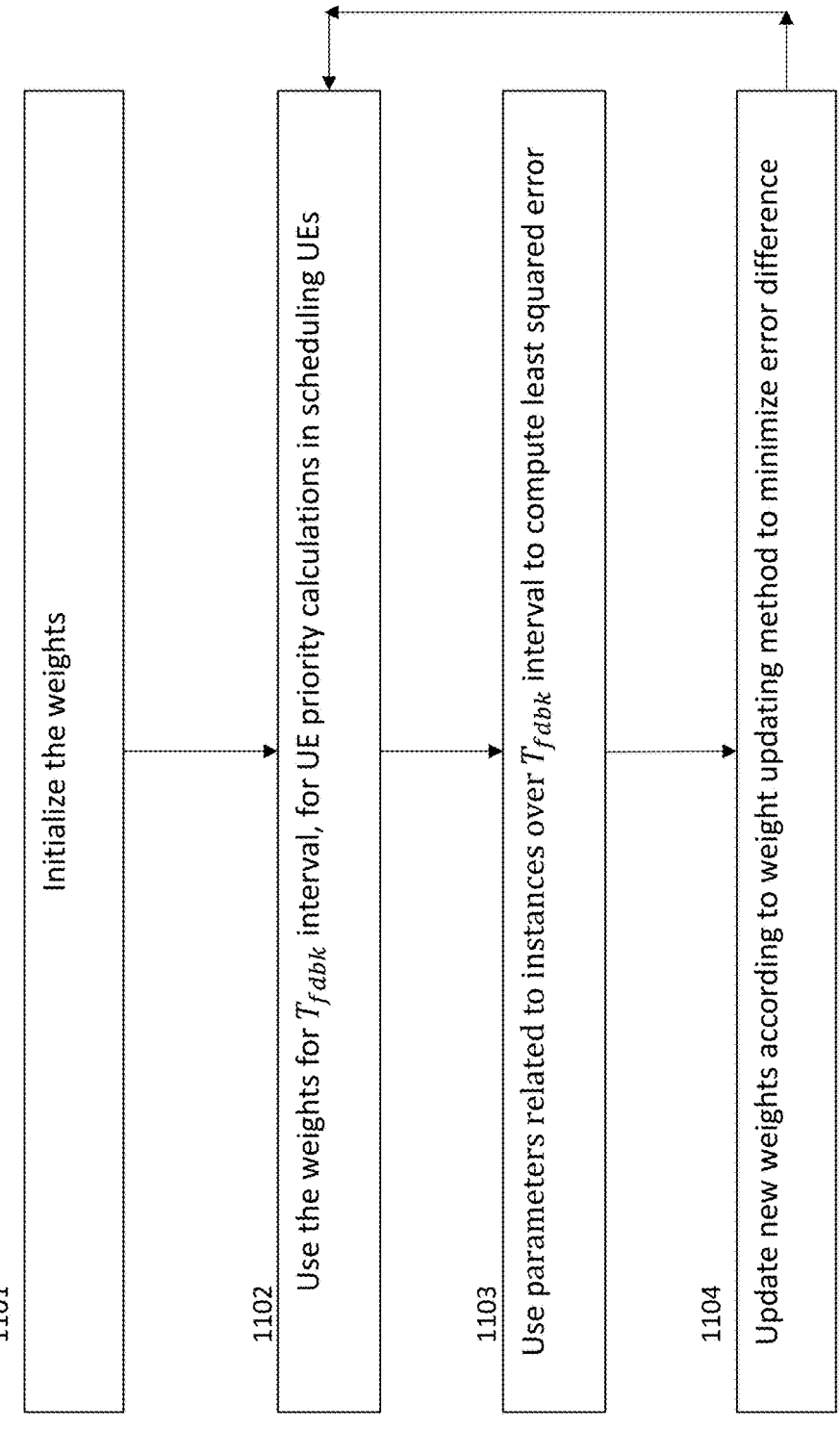
FIG. 11 is a flowchart summarizing an example weight computation method according to the present disclosure.

In this section, example embodiment of weight computation method is described in conjunction with FIG. 11, which summarizes the overall method. As shown in block 1101, the relevant weights (e.g., $W_{GBR}$, $W_{PDB}$ and $W_{PF}$) are initialized, i.e., the weights are configured based on some selected guidelines. For example, one can consider the case for which these weights can be common across all UEs or common across UEs within the same QoS class (i.e., 5QI for 5G systems), but different for various QoS classes. As shown in box 1102, the relevant weights will be used for an interval of $T_{fdbk}$ at the scheduler, e.g., MAC scheduler, as previously described above. As shown in box 1103, the parameters related to the instances in the $T_{fdbk}$ interval are used to compute the objective function, which is a least square error function. The main objective is to minimize this least square error function, which is sum of the error functions corresponding to PDB, GBR and PF. We compute the overall error function over two consecutive samples, calculate the difference, and update the relevant weights according to a weight updating method based on the difference (as shown in box 1104), which updating of the weights is explained in greater detail below.

The updating of the weights can vary on a case-by-case basis. For example, the weights can be changed (increased or decreased) gradually, aggressively or a mix of both based on the application. The updated weights will be used for an interval of $T_{fdbk}$ and the process repeats. As noted above, initialization of the weights involves configuring the weights based on some selected guidelines, e.g., weight for delay sensitive applications or GBR applications can be configured to be higher than other weights. The weights ($W_{GBR}$, $W_{PDB}$, $W_{PF}$) are to be determined to implement policy-based performance management (e.g., optimize the determination of the priority of UEs ($P_{UE}$) for a specific scenario). As part of this method, using the parameters that are received from the DU (as previously described above), the relevant weights are optimized by minimizing the proposed error function over $K_1$ training data instances (also referred to as sampling points), $K_1 \geq 2$, at $T_{fdbk}$ intervals (which can be static or dynamic), as explained below. We use least square error to compute the errors corresponding to Packet Delay Budget (PDB), Guaranteed Bit Rate (GBR), and PF, as explained below.

For the UE with delay more than it's assigned PDB, we define the PDB error ($E_{PDB}$ (t)) to be the sum of squared difference between the PDB to the delay at the UE over the $K_1$ training data instances. With increase in delay beyond the PDB, PDB error increases to reflect the lag the UE experiences for delay-sensitive applications:

$$E_{PDB}(t) = \sum_{i=1}^{K_1} E_{PDB,UE}^i = \sum_{i=1}^{K_1} \left( PDB_{UE}^i - Delay_{UE}^i \right)^2;$$
$$\text{where } E_{PDB,UE}^i = 0 \text{ if } PDB_{UE}^i > Delay_{UE}^i.$$

For the instances, where the UE-experienced delay $$(Delay_{UE}^i)$$

is within its PDB budget, we consider the corresponding error term as zero. Otherwise, the error is given as square of the deviation from the PDB budget, as represented above. For the above error function, which is used for delay-sensitive applications, we consider a sample set of delays that each packet experiences in a given time interval, and the worst-case delay in the sample set is used for error computation.

If for a UE (with GBR Data Radio Bearer), the achieved bit rate is less than the target guaranteed bit rate (GBR), it means that there is a deficit in the achieved rate, and the DU needs to send data at a higher rate for this UE to compensate for this deficit, which deficit is represented by the corresponding GBR error function ($E_{GBR}$(t)) given below. The GBR error for the UE with an achieved rate less than the target GBR is the sum of squared difference between the target GBR and the achieved GBR at the UE over the $K_1$ training data instances, as represented below:

$$E_{GBR}(t) = \sum_{i=1}^{K_1} E_{GBR,UE}^i = \sum_{i=1}^{K_1} \left( TarGbr_{UE}^i - AchvGbr_{UE}^i \right)^2;$$
$$\text{where } E_{GBR,UE}^i = 0 \text{ if } AchvGbr_{UE}^i > TarGbr_{UE}^i.$$

For the instances in which the UE overachieves (i.e., the achieved GBR rate is more than the target GBR rate), we consider the corresponding error term as zero. Otherwise, the error is taken as the square of deviation from the target GBR rate.

For UEs with different 5QI flows, to reduce the PDB error function, the Physical Resource Blocks (PRBs) allocation should be based on their packet delay budgets (PDBs). For UEs with different kinds of traffic, to reduce the GBR error function, the PRB allocation for the GBR UEs should be according to their guaranteed bit rates (GBRs). Either of these cases may lead to large deviation in the PRBs allocation across UEs. To mitigate this deviation, and to improve fairness of the system, we consider the PF error function ($E_{PF}$(t)) defined below. The PF error is the sum of squared difference between the average PRBs per UE (e.g., in the network) and the number of allocated PRBs to the UE over the $K_1$ training data instances.

$$E_{PF}(t) = \sum_{i=1}^{K_1} E_{PF,UE}^i = \sum_{i=1}^{K_1} \left( AvgPrb_{UE} - NPrb_{UE}^i \right)^2;$$
$$\text{where } E_{PF,UE}^i = 0 \text{ if } NPrb_{UE}^i > AvgPrb_{UE}.$$

For the instances in which the allocated PRBs to the UE are more than the average PRBs per UE across active UEs (e.g., in the network), we consider the corresponding error as zero.

In the above-described error functions for PDB, GBR and PF, $t = i * T_{fdbk}$, where i is a positive integer. For example, $t=1$ gives first $T_{fdbk}$ interval [1, $T_{fdbk}$], $t=2$ gives interval from [$T_{fdbk}+1$, $2*T_{fdbk}$], and so on. In accordance with the present disclosure, we optimize the weights to minimize the error function over $K_2$ training data instances at $T_{fdbk}$ interval (with training data received during [$T_{fdbk}+1$, $2*T_{fdbk}$]). The corresponding error function values $E_{PDB}$ (t+$T_{fdbk}$), $E_{GBR}$ (t+$T_{fdbk}$), and $E_{PF}$ (t+$T_{fdbk}$) are computed in a similar manner. In addition, as mentioned previously, the relevant weights are updated after every $T_{fdbk}$ interval, and $t=i*T_{fdbk}$, where i is a positive integer.

In another example embodiment, a variant of the above-described PF error function can be utilized. In this example embodiment, the total number of PRBs is utilized, instead of average number of PRBs that should be given to each UE in a proportional fair (PF) resource allocation method.

In another example embodiment, another error function ($E_{PF,5QI,j}$(t)) can be optionally further considered, which additional error function considers deviation in proportional fair (PF) behavior for UEs with DRBs of the same 5QI:

$$E_{PF,5QI,j}(t) = \sum_{i=1}^{K_1} E_{PF,UE,j}^i = \sum_{i=1}^{K_1} \left( AvgPrb_{UE,j} - NPrb_{UE,j}^i \right)^2;$$
$$\text{where } E_{PF,UE,j}^i = 0 \text{ if } NPrb_{UE,j}^i > AvgPrb_{UE,j},$$
$$\text{for } UEs \text{ supporting only } DRBs \text{ of type } 5QI j.$$

Figure 12:
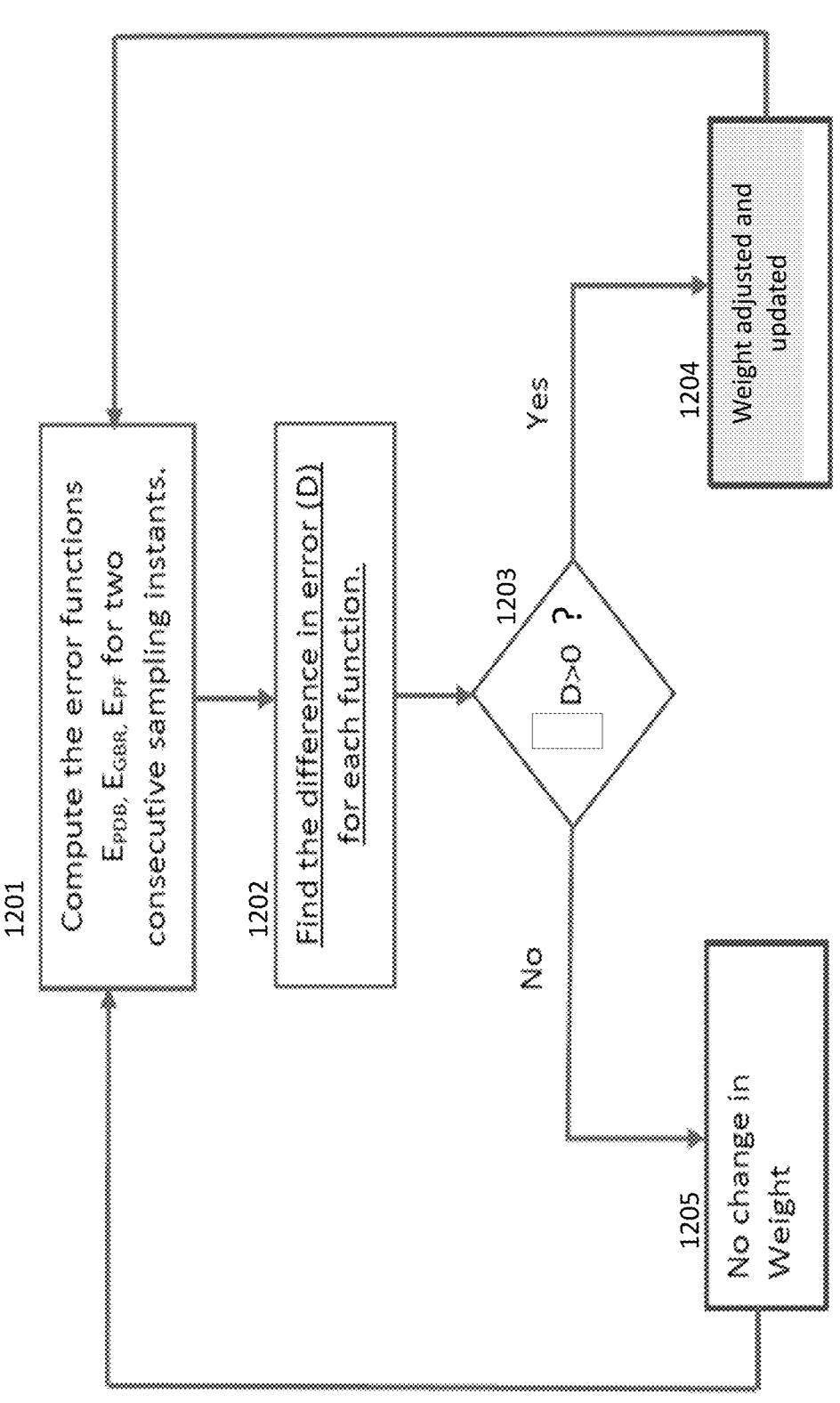
FIG. 12 is a flowchart of weight updating method according to the present disclosure.

The weights ($W_{GBR}$, $W_{PDB}$, $W_{PF}$) are updated, e.g., as shown in FIG. 12 (which will be explained in a subsequent section), based on the difference between the current error function and the previous error function, and the UE priorities are determined using the updated weights. The step size Delta is a value between (y1, y2), which is a configurable parameter (with y2>y1). For example, Delta in (0,1) implies a smaller step size, so the weights increase/decrease gradually.

According to an example embodiment of the method, the relevant weights can be common for all UEs in a cell, or the relevant weights can be common for UEs with traffic from the same QoS class (e.g., same 5QI for 5G systems).

For the case in which the relevant weights are common across all UEs, if the difference in the error function (for the delay part) increases over consecutive samples, we increase the weights associated with PDB, i.e., $W_{PDB}$. Increase of difference in error implies the overall delay across UEs is increasing (compared to their PDBs). To mitigate this increase in delay, or to make the UEs to meet their PDBs, $W_{PDB}$ is increased as given below:

$$\text{If } E_{PDB}(t+T_{fdbk})- E_{PDB}(t) > 0$$
$$W_{PDB}(t+T_{fdbk})= (1+\text{Delta}_{PDB\_stepup})* W_{PDB}(t);$$
$$\text{else,}$$
$$\text{No change in weight across UEs.}$$

In the above expressions, $0<\text{Delta}_{PDB\_stepup}<\text{Thresh}_{PDB}$, i.e., $\text{Delta}_{PDB\_stepup}$ is the PDB step size, which is upper-bounded by $\text{Thresh}_{PDB}$ In another example embodiment, for the case in which the UEs are classified based on the QoS class (i.e., 5QI for 5G systems) of the critical DRB, the error function can be redefined as multiple sums over these QoS classes to calculate the error across each class. In this case, the weight updating method is redefined by considering same weights for the UEs having similar 5QI.

For the case in which the weights are common across all UEs, if the difference in the error function for the throughput part of the GBR DRBs increases in consecutive samples, we increase the weights associated with GBR throughput, i.e., $W_{GBR}$. Increase of difference in error implies the UEs' current sample achieved rate is less than the previous sample achieved rate. To reduce the variance between the achieved bit rate and the target bit rates across UEs, or to make UEs to meet their target GBRs, $W_{GBR}$ is increased as given below:

$$\text{If } E_{GBR}(t+T_{fdbk})- E_{GBR}(t) > 0$$
$$W_{GBR}(t+T_{fdbk})= (1+\text{Delta}_{GBR\_stepup})* W_{GBR}(t);$$
$$\text{else,}$$
$$\text{No change in weight across UEs.}$$

In the above expressions, $0<\text{Delta}_{GBR\_stepup}<\text{Thresh}_{GBR}$, i.e., $\text{Delta}_{GBR\_stepup}$ is the GBR step size, which is upper-bounded by $\text{Thresh}_{GBR}$.

For the case in which the weights are common across all UEs, if difference in the error function (for the PF part) increases over consecutive samples, we increase the weights associated with the PF factor, i.e., $W_{PF}$. Increase of difference in error implies, across UEs, the variance between average PRBs and allocated PRBs of the current sample is more than that of the previous sample. To reduce the variance between average PRBs and allocated PRBs across UEs, the $W_{PF}$ is increased as given below:

$$\text{If } E_{PF}(t+T_{fdbk})- E_{PF}(t) > 0$$
$$W_{PF}(t+T_{fdbk})= (1+\text{Delta}_{PF\_stepup})* W_{PF}(t);$$
$$\text{else,}$$
$$\text{No change in weight across UEs.}$$

In the above expressions, $0<\text{Delta}_{PF\_stepup}<\text{Thresh}_{PF}$, i.e., $\text{Delta}_{PF\_stepup}$ is the step size, which is upper-bounded by $\text{Thresh}_{PF}$.

According to an example embodiment, a weight threshold, Wm, is specified, which is a large value. If any one of the weights (i.e., $W_{5QI}$, $W_{GBR}$, $W_{PDB}$, and $W_{PF}$) reaches $W_{Th}$, we adjust the threshold-exceeding weight by subtracting a value corresponding to the minimum value among the weights, and proceed with these new weights. For the 5QI priority, no explicit weight updating is applied. If the 5QI priority is not in the range of other weights, the 5QI priority can be periodically (e.g., function of $T_{fdbk}$) reset to a value corresponding to the minimum value among the other three weights.

According to an example embodiment, if one priority relative error (between consecutive samples) is very large compared to other relative errors over consecutive intervals, then the relevant weight can be increased in an aggressive manner till they are in a comparable range. If the relative error is bare minimum over consecutive intervals, then the corresponding weight can be decreased gradually.

Although the above example method has been described as using a constant step size for step-up, an alternative example embodiment can use a dynamically varying step size. In addition, although the above example method has been described in the context of using one logical channel (or DRB) per-UE, the above example method is equally applicable for the case in which a UE supports multiple DRBs. In the case of more than one logical channel (LC) per UE, an example method can consider the LC with the highest priority.

FIG. 12 is a flowchart summarizing the overall weight updating method discussed above. As shown in box 1201, the error functions $E_{PDB}$, $E_{GBR}$, and $E_{PF}$ are computed for two consecutive sampling instants. As shown in box 1202, for each error function, the difference in error (Delta, or "D") between the two sampling instants is determined. If D is greater than 0 (as shown in the decision box 1203) for a particular error function, then the corresponding weight is adjusted (e.g., increased) and updated (as shown in box 1204). If D is not greater than 0, then no change in weight is implemented (as shown in box 1205).

In this section, an example embodiment of a method for policy-based performance management in an O-RAN system using an RIC will be discussed, in conjunction with FIG. 13 and FIG. 14. As part of this method, the following parameters are sent to the near-real-time RAN Intelligent Controller (near-RT RIC) from the RAN over the E2 interface to train the machine learning (ML) model that is deployed at the near-real-time RIC. These parameters are forwarded from the RAN to the near-RT RIC at $T_{fdbk}$ interval, and the value of each parameter of a single UE acquired in a $T_{fdbk}$ interval define an "instance". $T_{fdbk}$ interval is measured in number of time slots. Every $T_{fdbk}$, multiple instances (of parameters) are sent to the near-RT RIC. Although a static $T_{fdbk}$ is assumed in the present example embodiment, the example method is equally applicable in the case of dynamic intervals.

In the example embodiment, the following RAN-related parameters can be communicated to the near-RT RIC via E2 interface (by adding suitable objects in the E2 protocol):

1. $W_{GBR}$—this is the current weight of $P_{GBR}$, which can be communicated from DU to near-RT RIC.

2. $W_{PDB}$—this is the current weight of $P_{PDB}$, which can be communicated from DU to near-RT RIC.

3. $W_{PF}$—this is the current weight of $P_{PF}$, which can be communicated from DU to near-RT RIC.

4. $PDB_{UE}$—this is the packet delay budget corresponds to the particular UE's QoS flow.

5. $Delay_{UE}$—this is the sum of the midhaul, backhaul and $Age_{RLC}$ delays ($QDelay_{CU-UP}$+$QDealy_{RLC}$) of the UE.

$$Delay_{UE} =$$

$$MidhaulDelay_{UE} + BackhaulDelay_{UE} + QDelay_{CU-UP} + QDealy_{RLC}.$$

Here, queueing delay in RLC queues, $QDelay_{RLC}$, can be communicated from DU to RIC, and other delay components can be communicated from CU-UP to RIC.

Alternatively, we can communicate $MidhaulDelay_{UE}$+$BackhaulDelay_{UE}$+$QDelay_{CU-CP}$ from CU-UP to DU by adding suitable objects in F1-C and communicate $Delay_{UE}$ from DU to RIC via E2.

6. $TarGbr_{UE}$—this is the target GBR of the UE, which can be communicated from DU to near-RT RIC.

7. $AchvGbr_{UE}$—this is the current achieved bit rate of the UE, which can be communicated from DU to near-RT RIC. If $AchvGbr_{UE}$>$TarGbr_{UE}$, we may optionally consider $AchvGbr_{UE}$=$TarGbr_{UE}$.

8. $Nprb_{UE}$—this is the number of PRBs allocated to each UE in the TTI, which value can be communicated from DU to near-RT RIC.

9. $AvgPrb_{UE}$—The ratio of total Prbs to the number of active UEs in the system, which value can be communicated from DU to near-RT RIC.

10. 1 or more operator policy to be applied.

Figure 13:
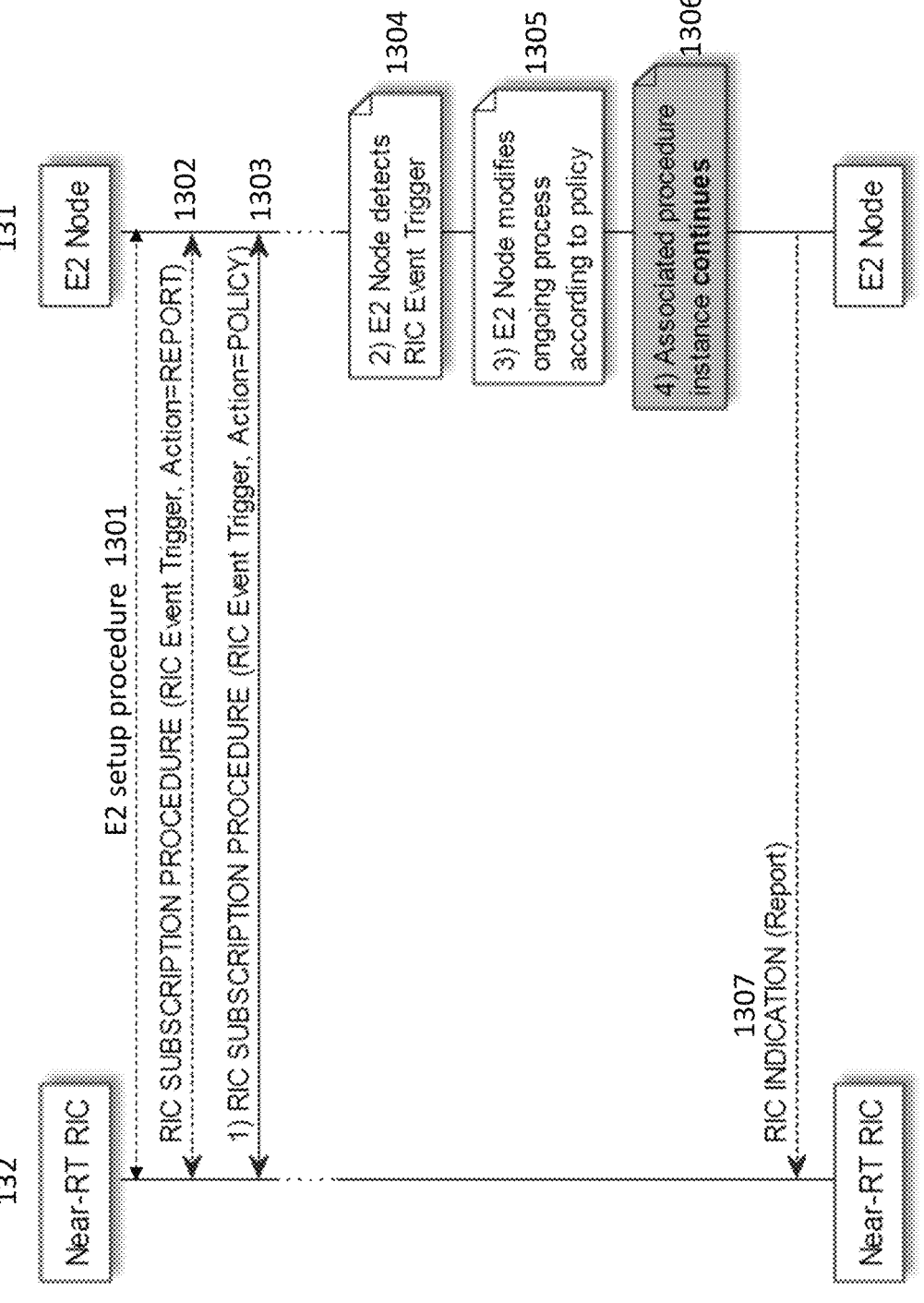
FIG. 13 is a signal flow diagram of E2AP SUBSCRIPTION procedure utilized for policy-based performance management in an O-RAN system using an RIC.

As shown in FIG. 13, which is a signal flow diagram of E2AP SUBSCRIPTION procedure utilized for policy-based performance management in an O-RAN system using a RIC module, the example method starts with an E2 setup procedure 1301 between the E2 Node 131 (which encompasses DU and CU) and the near-RT RIC 132, which E2 setup procedure is as specified in the O-RAN and 3GPP specifications. The next step 2 involves the RIC subscription procedure including a sequence of actions: i) Near-RT RIC requests a SUBSCRIPTION from the E2 Node 131 for REPORT, with the corresponding Event Trigger (e.g., periodic trigger), and the E2 Node 131 acknowledges the SUBSCRIPTION (generally referenced by the process arrow 1302); and ii) Near-RT RIC requests a SUBSCRIPTION from the E2 Node 131 for POLICY, with the corresponding Event Trigger (e.g., periodic trigger), and the E2 Node 131 acknowledges the SUBSCRIPTION (generally referenced by the process arrow 1303). In this manner, the Near-RT RIC subscribes to the above-listed parameters from the E2 Node (DU and/or CU) and provides the triggers for the E2 Node to communicate the subscribed information. Subsequently, the E2 Node (DU and/or CU) detects the RIC event trigger (as shown in box 1304). In the case of the REPORT trigger event occurring, the REPORT service sends the above-listed RAN-related DU and/or CU parameters from the E2 Node 131 (DU and/or CU) to the Near-RT RIC 132 in an RIC INDICATION report (as shown by the process arrow 1307). The Near-RT RIC uses the received information to implement weight updating to obtain (compute) new weights as discussed above. In parallel, DU continues to run radio resource management methods (including scheduling methods) with the latest set of weights it had received before the current time, as shown in box 1306. Once the event corresponding to the POLICY action is triggered at the Near-RT RIC 132 (which occurs when the scheduler weights are updated at the near-RT RIC 132), the near-RT RIC 132 communicates the updated weights to the E2 Node (i.e., DU in this case), and the E2 Node (i.e., DU) modifies the scheduler process according to information contained in the POLICY description (i.e., new weights are provided to the scheduler), as summarized in box 1305.

Figure 14:
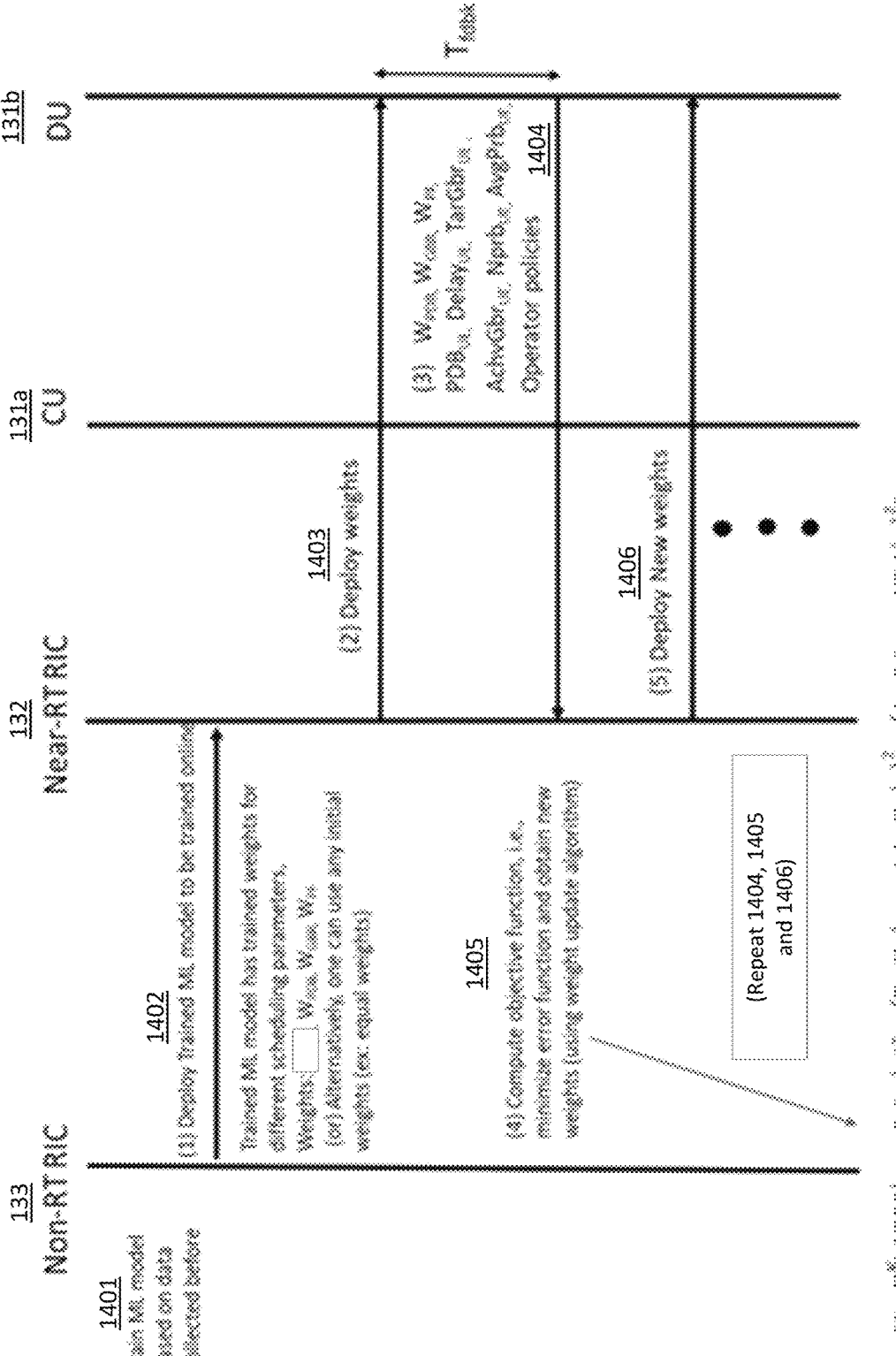
FIG. 14 is a signal flow diagram of an example embodiment of a method for enhanced RRM utilizing machine-learning-based technique at a RAN Intelligent Controller (RIC) to determine suitable values of the weights for determining scheduling priority of UEs.

We now turn to FIG. 14, which illustrates a signal flow diagram of an example embodiment of a method for enhanced RRM utilizing machine-learning-based technique at a RAN Intelligent Controller (RIC) to determine suitable values of the weights for determining scheduling priority of UEs. In the initial training phase (referenced by 1401), various RAN-related parameters previously listed above and have been collected (e.g., weights of various priority values for GBR, PDB and PF, etc.) are used to train a machine learning (ML) model, which can be run at non-RT RIC 133. As referenced by 1402, the trained ML model is deployed at near-RT RIC 132, where the training of the ML model continues. The trained ML model has trained weights for the various scheduling parameters, e.g., the priority weights $W_{GBR}$, $W_{PDB}$, and $W_{PF}$. Alternatively, equal weights for the priority weights can be used initially. As referenced by 1403, the trained weights (or equal weights, if so chosen) from the near-RT RIC 132 are deployed at CU 131a and/or DU 131b. As referenced by 1404, at $T_{fdbk}$ interval, the above-listed RAN-related parameters are reported from DU 131b and/or CU 131a to the near-RT RIC 132.

Continuing with FIG. 14, as referenced by 1405, the near-RT RIC implements the weight updating method discussed above, i.e., the relevant weights are optimized by minimizing the proposed error function over $K_1$ training data instances at $T_{fdbk}$ intervals. The parameters related to the instances in this $T_{fdbk}$ interval are used to compute the objective function, which is a least squared error function. The main objective is to minimize this least square error function which is sum of the error functions corresponding to Packet Delay Budget (PDB), Guaranteed Bit Rate (GBR), and PF factors. Each error function defined corresponding to the PDB, GBR and PF factor is a positive term which is squared errors summed over $K_1$ training instances. We compute the overall error function over two consecutive samples, calculate the difference and update weights based on this difference. The objective function can be expressed as follows:

$$Min \sum_{i=1}^{K_1} \left[ (PDB_{UE}^i - Delay_{UE}^i)^2 + \right.$$
$$\left. (TarGbr_{UE}^i - AchvGbr_{UE}^i)^2 + (AvgPrb_{UE} - NPrb_{UE}^i)^2 \right]$$

As referenced by 1406, the new, updated weights computed at the near-RT RIC 132 are deployed at the DU 131b. Process steps referenced by 1404, 1405 and 1406 are repeated.

In another example embodiment, a network operator can specify at least one desired policy, which is used along with the previous example method to optimize the values for the scheduler weights. In one example policy, the operator can specify a higher preference for increased cell throughput and accept performance degradation for some UEs and their associated applications. In this case, Delta$_{PF\_stepup}$ described above (in connection with weight increase) can be chosen to be higher than the usual Delta$_{PF\_stepup}$, or $W_{PF}$ can be increased in a more aggressive way. In another example policy, the operator can give a higher preference to delay sensitive applications. In this case, Delta$_{PDB\_stepup}$ can be chosen to be higher than the usual value, or $W_{PDB}$ can be increased more aggressively.

While the present disclosure has been described with reference to one or more exemplary embodiments, it will be understood by those skilled in the art that various changes may be made and equivalents may be substituted for elements thereof without departing from the scope of the present disclosure. For example, although the example methods have been described in the context of 5G cellular networks, the example methods are equally applicable for 4G and other similar wireless networks. Furthermore, example methods described herein can be implemented i) at an RIC in conjunction with DU and/or CU, or ii) at DU and/or CU only (if enough processing resources available at DU/CU). In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

For the sake of completeness, a list of abbreviations used in the present specification is provided below:

5GC: 5G Core Network
5G NR: 5G New Radio
5QI: 5G QoS Identifier
ACK: Acknowledgement
AM: Acknowledged Mode
APN: Access Point Name
BS: Base Station
CP: Control Plane
CU: Centralized Unit
CU-CP: Centralized Unit-Control Plane
CU-UP: Centralized Unit-User Plane
DL: Downlink
DDDS: DL Data Delivery Status
DNN: Data Network Name
DRB: Data Radio Bearer
DU: Distributed Unit
eNB: evolved NodeB
EPC: Evolved Packet Core
GBR: Guaranteed Bit Rate
gNB: gNodeB (next generation node B)
GTP-U: GPRS Tunneling Protocol-User Plane
L1: Layer 1
L2: Layer 2
L3: Layer 3
LC: Logical Channel
MAC: Medium Access Control
NAS: Non-Access Stratum
NR-U: New Radio-User Plane
O-RAN: Open Radio Access Network
PDB: Packet Delay Budget
PDCP: Packet Data Convergence Protocol
PDU: Protocol Data Unit
PHY: Physical Layer
QCI: QoS Class Identifier
QFI: QoS Flow Identifier
QOS: Quality of Service
RDI: Reflective QoS Flow to DRB Indication RLC: Radio Link Control
RLC-AM: RLC Acknowledged Mode
RLC-UM: RLC Unacknowledged Mode
RQI: Reflective QoS Indication
RRC: Radio Resource Control
RRM: Radio Resource Management
RTP: Real-Time Transport Protocol
RTCP: Real-Time Transport Control Protocol
RU: Radio Unit
SCTP: Stream Control Transmission Protocol
SDAP: Service Data Adaptation Protocol
TCP: Transmission Control Protocol
TEID: Tunnel Endpoint Identifier
UE: User Equipment
UP: User Plane
UL: Uplink
UM: Unacknowledged Mode
UPF: User Plane Function

The invention claimed is:

1. A method for implementing enhanced radio resource management of radio access network (RAN) based on machine-learning-based technique, comprising:

deploying, from a RAN Intelligent Controller (RIC) to a distributed unit (DU) of the RAN, a trained machine-learning-based model trained on a plurality of RAN-related parameters for a selected user equipment (UE) on the RAN, wherein the trained machine-learning-based model comprises the plurality of RAN-related parameters including i) plurality of trained weights for determining scheduling priority of the selected UE, ii) a network operator policy influencing scheduling priority of the selected UE, and iii) at least one of Packet Delay Budget (PDB), a target guaranteed bit rate (GBR), and proportional fair (PF) metric of the selected UE;

sending, from the DU to the RIC, values of the plurality of RAN-related parameters for the selected UE observed at least at a first sampling time point and a sequentially following second sampling time point;

computing, at the RIC, a difference between 1) a first value of overall error function for PDB, GBR, and PF calculated based on corresponding observed values at the first sampling time point, and 2) a second value of overall error function for PDB, GBR, and PF calculated based on corresponding observed values at the second sampling time point; and updating, at the RIC, the plurality of weights based on the difference between the first and second values of the overall error function.

2. The method according to claim 1, wherein the RIC deploying the trained machine-learning model is a near-real time RIC.

3. The method according to claim 2, further comprising: implementing an RIC subscription procedure between the RIC and the DU to facilitate the sending of the values of the plurality of RAN-related parameters from the DU to the RIC.

4. The method according to claim 2, wherein:

i) for UE-experienced delay falling within the PDB, corresponding error term for PDB is considered as zero; and ii) for UE-experienced delay exceeding the PDB, corresponding error term for PDB is square of deviation of the UE-experienced delay from the PDB.

5. The method according to claim 4, wherein:

i) for achieved GBR exceeding the target GBR, corresponding error term for GBR is considered as zero; and ii) for achieved GBR falling below the target GBR, corresponding error term for GBR is square of deviation of the achieved GBR from the target GBR rate.

6. The method according to claim 5, wherein:

i) for allocated PRBs to the selected UE exceeding average PRBs per UE in the network, corresponding error term for PF is considered as zero; and ii) for allocated PRBs to the selected UE falling below average PRBs per UE in the network, corresponding error term for PF is square of deviation between the number of allocated PRBs to the selected UE and the average PRBs per UE in the network.

7. The method according to claim 3, wherein the plurality of RAN-related parameters sent from the DU to the RIC include:

$W_{GBR}$ representing current weight of priority value $P_{GBR}$ for GBR;

$W_{PDB}$ representing current weight of priority value $P_{PDB}$ for PDB;

$W_{PF}$ representing current weight of priority value $P_{PF}$ for PF;

$PDB_{UE}$ representing packet delay budget corresponding to the selected UE's Quality of Service (QOS) flow;

$Delay_{UE}$ representing overall delay experienced by the selected UE;

$Delay_{UE}=MidhaulDelay_{UE}+BackhaulDelay_{UE}+QDe-lay_{CU-UP}+QDealy_{RLC}$;

$TarGbr_{UE}$ representing the target GBR of the UE;

$AchvGbr_{UE}$ representing current achieved bit rate of the selected UE;

$Nprb_{UE}$ representing the number of physical resource blocks (PRBs) allocated to the selected UE in a transmission time interval (TTI);

$AvgPrb_{UE}$ representing the ratio of total PRBs to the number of active UEs in the RAN; and the network operator policy.

8. The method according to claim 7, wherein observed values of the plurality of RAN-related parameters for the selected UE are sent at each one of a plurality of sequential time intervals $T_{fdbk}$.

9. The method according to claim 8, wherein:

the overall error function for PDB, GBR, and PF is a sum of error functions corresponding to PDB, GBR, and PF;

the overall error function for PDB, GBR, and PF is computed over at least two consecutive sampling time points corresponding to at least two consecutive $T_{fdbk}$ intervals; and $W_{GBR}$, $W_{PDB}$, and $W_{PF}$ are updated based on the difference between the computed overall error function values for the at least two consecutive sampling time points.

10. The method according to claim 9, wherein:

$W_{GBR}$, $W_{PDB}$, and $W_{PF}$ are optimized by minimizing the overall error function for PDB, GBR, and PF over $K_1$ sampling time points corresponding to $K_1$ number of $T_{fdbk}$ intervals, as follows:

$$\text{Min} \sum_{i=1}^{K_1}\left[(PDB_{UE}^i - \text{Delay}_{UE}^i)^2 + \right.$$
$$\left.(TarGbr_{UE}^i - AchvGbr_{UE}^i)^2 + (AvgPrb_{UE}^i - NPrb_{UE}^i)^2\right].$$

11. A system for implementing enhanced radio resource management of radio access network (RAN) based on machine-learning-based technique, comprising:

a RAN Intelligent Controller (RIC) configured to deploy, to a distributed unit (DU) of the RAN, a trained machine-learning-based model trained on a plurality of RAN-related parameters for a selected user equipment (UE) on the RAN, wherein the trained machine-learning-based model comprises the plurality of RAN-related parameters including i) plurality of trained weights for determining scheduling priority of the selected UE, ii) a network operator policy influencing scheduling priority of the selected UE, and iii) at least one of Packet Delay Budget (PDB), a target guaranteed bit rate (GBR), and proportional fair (PF) metric of the selected UE;

wherein the DU is configured to send, to the RIC, values of the plurality of RAN-related parameters for the selected UE observed at least at a first sampling time point and a sequentially following second sampling time point;

and wherein the RIC is further configured to:

a) compute a difference between 1) a first value of overall error function for PDB, GBR, and PF calculated based on corresponding observed values at the first sampling time point, and 2) a second value of overall error function for PDB, GBR, and PF calculated based on corresponding observed values at the second sampling time point; and b) update the plurality of weights based on the difference between the first and second values of the overall error function.

12. The system according to claim 11, wherein the RIC configured to deploy the trained machine-learning model is a near-real time RIC.

13. The system according to claim 12, wherein the RIC and the DU are configured to implement an RIC subscription procedure between the RIC and the DU to facilitate the sending of the values of the plurality of RAN-related parameters from the DU to the RIC.

14. The system according to claim 12, wherein:

i) for UE-experienced delay falling within the PDB, corresponding error term is considered as zero; and ii) for UE-experienced delay exceeding the PDB, corresponding error term is square of deviation of the UE-experienced delay from the PDB.

15. The system according to claim 14, wherein:

i) for achieved GBR exceeding the target GBR, corresponding error term is considered as zero;

ii) for achieved GBR falling below the target GBR, corresponding error term is square of deviation from the target GBR rate.

16. The system according to claim 15, wherein:

i) for allocated PRBs to the selected UE exceeding average PRBs per UE in the network, corresponding error term for PF is considered as zero; and ii) for allocated PRBs to the selected UE falling below average PRBs per UE in the network, corresponding error term for PF is square of deviation between the number of allocated PRBs to the selected UE and the average PRBs per UE in the network.

17. The system according to claim 13, wherein the plurality of RAN-related parameters sent from the DU to the RIC include:

$W_{GBR}$ representing current weight of priority value $P_{GBR}$ for GBR;

$W_{PDB}$ representing current weight of priority value $P_{PDB}$ for PDB;

$W_{PF}$ representing current weight of priority value $P_{PF}$ for PF;

$PDB_{UE}$ representing packet delay budget corresponding to the selected UE's Quality of Service (QOS) flow;

$Delay_{UE}$ representing overall delay experienced by the selected UE;

$Delay_{UE}=MidhaulDelay_{UE}+BackhaulDelay_{UE}+QDelay_{CU-UP}+QDealy_{RLC}$;

$TarGbr_{UE}$ representing the target GBR of the UE;

$AchvGbr_{UE}$ representing current achieved bit rate of the selected UE;

$Nprb_{UE}$ representing the number of physical resource blocks (PRBs) allocated to the selected UE in a transmission time interval (TTI);

$AvgPrb_{UE}$ representing the ratio of total PRBs to the number of active UEs in the RAN; and the network operator policy.

18. The system according to claim 17, wherein observed values of the plurality of RAN-related parameters for the selected UE are sent at each one of a plurality of sequential time intervals $T_{fdbk}$.

19. The system according to claim 18, wherein:

the overall error function for PDB, GBR, and PF is a sum of error functions corresponding to PDB, GBR, and PF;

the overall error function for PDB, GBR, and PF is computed over at least two consecutive sampling time points corresponding to at least two consecutive $T_{fdbk}$ intervals; and $W_{GBR}$, $W_{PDB}$, and $W_{PF}$ are updated based on the difference between the computed overall error function values for the at least two consecutive sampling time points.

20. The system according to claim 19, wherein:

$W_{GBR}$, $W_{PDB}$, and $W_{PF}$ are optimized by minimizing the overall error function for PDB, GBR, and PF over $K_1$ sampling time points corresponding to $K_1$ number of $T_{fdbk}$ intervals, as follows:

$$\text{Min} \sum_{i=1}^{K_1} \left[ \left( PDB_{UE}^i - Delay_{UE}^i \right)^2 + \left( TarGbr_{UE}^i - AchvGbr_{UE}^i \right)^2 + \left( AvgPrb_{UE} - NPrb_{UE}^i \right)^2 \right].$$

* * * * *